United States Patent
Zhang

(10) Patent No.: US 11,496,186 B2
(45) Date of Patent: Nov. 8, 2022

(54) METHOD AND DEVICE IN UE AND BASE STATION USED FOR MULTI-ANTENNA TRANSMISSION

(71) Applicant: GUANGDONG OPPO MOBILE TELECOMMUNICATIONS CORP., LTD., Guangdong (CN)

(72) Inventor: XiaoBo Zhang, Shanghai (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 94 days.

(21) Appl. No.: 16/655,259

(22) Filed: Oct. 17, 2019

(65) Prior Publication Data

US 2020/0052744 A1 Feb. 13, 2020

Related U.S. Application Data

(63) Continuation of application No. PCT/CN2018/080984, filed on Mar. 29, 2018.

(30) Foreign Application Priority Data

Apr. 18, 2017 (CN) .......................... 201710251472.8

(51) Int. Cl.
*H04B 7/0452* (2017.01)
*H04W 76/27* (2018.01)
(Continued)

(52) U.S. Cl.
CPC ......... *H04B 7/0452* (2013.01); *H04B 7/0617* (2013.01); *H04B 7/0626* (2013.01);
(Continued)

(58) Field of Classification Search
CPC .. H04B 7/0452; H04B 7/0617; H04B 7/0626; H04B 7/086; H04W 76/27; H04L 5/005; H04L 25/0228
See application file for complete search history.

(56) References Cited

U.S. PATENT DOCUMENTS 9,179,453 B2 11/2015 Papasakellariou et al.
10,944,598 B2 * 3/2021 Shi ..................... H04L 27/2613
(Continued)

FOREIGN PATENT DOCUMENTS

CN 103973399 A 8/2014
CN 105099632 A 11/2015
(Continued)

OTHER PUBLICATIONS

ISR received in application No. PCT/CN2018/080984 dated May 30, 2018.
(Continued)

*Primary Examiner* — Justin T Van Roie
(74) *Attorney, Agent, or Firm* — Perkins Coie LLP

(57) ABSTRACT

The present disclosure provides a method and a device in a User Equipment (UE) and a base station for multi-antenna transmission. A first node operates first downlink information. The first field of the first downlink information is used for determining a first radio resource, and the second field of the first downlink information is used for determining a second radio resource. The first radio resource is reserved for a first-type reference signal, and the second radio resource is reserved for a second-type reference signal. A target receiver of the first-type reference signal comprises the first node, a transmitter of the second-type reference signal is the first node. A measurement on the first-type reference signal is used for generating the second-type reference signal. The first node is a UE and the operating
(Continued)

action is receiving; or the first node is a base station and the operating action is transmitting.

20 Claims, 12 Drawing Sheets

(51) Int. Cl.
*H04B 7/06* (2006.01)
*H04B 7/08* (2006.01)
*H04L 5/00* (2006.01)
*H04L 25/02* (2006.01)

(52) U.S. Cl.
CPC ............. *H04B 7/086* (2013.01); *H04L 5/005* (2013.01); *H04L 25/0228* (2013.01); *H04W 76/27* (2018.02)

(56) References Cited

U.S. PATENT DOCUMENTS

| | | |
|---|---|---|
| 2014/0119301 A1 | 5/2014 | Park et al. |
| 2017/0279505 A1 | 9/2017 | Zhang et al. |
| 2018/0006845 A1 | 1/2018 | Bonghoe et al. |

FOREIGN PATENT DOCUMENTS

| | | |
|---|---|---|
| CN | 105429683 A | 3/2016 |
| CN | 105634658 A | 6/2016 |
| CN | 105991264 A | 10/2016 |
| CN | 106411375 A | 2/2017 |
| CN | 106470096 A | 3/2017 |
| EP | 2875690 A | 5/2015 |
| EP | 2875690 A1 | 5/2015 |
| EP | 3590203 A1 | 1/2020 |
| WO | 2016095110 A1 | 6/2016 |
| WO | 2016111524 A1 | 7/2016 |

OTHER PUBLICATIONS

ZTE et al: "QCL/QCB design for UL MIMO",3GPP Draft; RI-1704416 QCL QCB Design for UL MIMO, 3rd Generation Partnership Project (3GPP), Mobile Competence Centre :650, Route Des Lucioles ; F-06921 Sophia-Antipolis Cedex ; France vol. RAN WG1, no. Spokane, USA; Apr. 3, 2017-Apr. 7, 2017 Apr. 2, 2017 (Apr. 2, 2017).
SR received in application No. 18787338.5 dated Mar. 24, 2020.
CN First Search Report in application No. 201710251472.8 dated Dec. 26, 2019.
CN First Office Action in Application No. 201710251472.8 dated Jan. 6, 2020.
CN Notice of Allowance in Application No. 201710251472.8 dated Mar. 7, 2020.
First Office Action of the European application No. 18787338.5, dated Apr. 14, 2021.
"3rd Generation Partnership Project; Technical Specification Group Radio Access Network; Evolved Universal Terrestrial Radio Access (E-UTRA); Radio Resource Control (RRC); Protocol specification(Release 14)", 3GPP Standard; 3GPP TS 36.331, vol. RAN WG2, No. V14.0.0, Oct. 4, 2016 (Oct. 4, 2016). 643 pages.
English translation of the Written Opinion of the International Search Authority in the international application No. PCT/CN2018/080984, dated May 30, 2018. 9 pages with English translation.
3GPP TSG RAN WG1 Meeting #88bis R1-1704399, Spokane, USA Apr. 3-7, 2017, Source: ZTE, ZTE Microelectronics, Title: UL beam management, Agenda Item: 8 1.2.2.1, Document for: Discussion and Decision.
3GPP TSG-RAN2 Meeting #97 R2-1701145, Athens, Greece,Feb. 13-17, 2017, Title: Introducing RRC parameters for eFD-MIMO(REL-14), Source to WG: Samsung.
European Search Report in the European application No. 22183457.5, dated Sep. 14, 2022.

* cited by examiner

METHOD AND DEVICE IN UE AND BASE STATION USED FOR MULTI-ANTENNA TRANSMISSION

CROSS-REFERENCE TO RELATED APPLICATION

This application is a continuation of International Application No. PCT/CN2018/080984, filed Mar. 29, 2018, claiming the priority benefit of Chinese Patent Application Serial Number 201710251472.8, filed on Apr. 18, 2017, the full disclosure of which is incorporated herein by reference.

BACKGROUND

Technical Field

The present disclosure relates to transmission methods and devices in wireless communication systems, and in particular to a transmission scheme and device in a wireless communication system that supports multi-antenna transmission.

Related Art

Massive Multi-Input Multi-Output (MIMO) becomes a hot topic when studying next generation mobile communications. For the massive MIMO, multiple antennas based on beamforming form a narrow beam which points to a particular direction to improve the quality of communication. To ensure that a beam points in the right direction, both sides of communication need to know (part of) channel information of radio channels. In traditional Long Term Evolution (LTE) system, a commonly used method of acquiring channel information is to let the receiver of radio signal(s) estimate Channel Status Information (CSI) by measuring a reference signal and then reports/feeds back the estimated CSI to the transmitter of the radio signal(s). In MIMO system, as the number of antennas rises, reference signals and feedback overhead required by the traditional method will increase accordingly. To cut such overhead, a 5G system will make full use of the channel reciprocity of uplink and downlink channels to acquire (part of) channel information, particularly in a Time-Division Duplex (TDD) system. Given that channel reciprocity can be applied, how to design uplink and downlink reference signals to optimize the system performance and reduce overhead remains to be studied.

SUMMARY

The inventors have found through researches that in a system where there is (partial) channel reciprocity between uplink and downlink channels, a connection created between uplink and downlink reference signals can ensure effective utilization of the channel reciprocity, which helps improve the quality of channel estimation. In order to reduce relevant configuration signaling overhead, collaborative configuration of associated uplink reference signal and downlink reference signal can be performed.

In view of the above problem, the present disclosure provides a solution. It should be noted that though originally targeted at multi-antenna transmission, the present disclosure is also applicable to single-antenna transmission. The embodiments of a first node in the present disclosure and the characteristics in the embodiments may be applied to a second node if no conflict is incurred, and vice versa. And the embodiments of the present disclosure and the characteristics in the embodiments may be mutually combined if no conflict is incurred.

The present disclosure provides a method in a first node for multi-antenna transmission, comprising:

operating first downlink information;

herein, the first downlink information is an information element, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a target receiver of the first-type reference signal comprises the first node, a transmitter of the second-type reference signal is the first node; a measurement on the first-type reference signal is used for generating the second-type reference signal; the first node is a User Equipment (UE), and the operating is receiving, or the first node is a base station, and the operating is transmitting.

In one embodiment, an advantage of the above method is that a connection is created between the first-type reference signal and a second-type reference signal, by utilizing the channel reciprocity, and determining the direction in which a transmitting beam of the second-type reference signal points based on a measurement on the first-type reference signal, the overhead of the second-type reference signal can be reduced.

In one embodiment, another advantage of the above method is that the first radio resource and the second radio resource are configured simultaneously by a same information element (IE), thus reducing the overhead of a configuration signaling relevant to creating a connection between the first-type reference signal and the second-type reference signal.

In one embodiment, the first downlink information is carried by a higher layer signaling.

In one embodiment, the first downlink information is carries by a Radio Resource Control (RRC) signaling.

In one embodiment, the information element is a CSI-Process IE.

In one embodiment, the first downlink information is a CSI-Process IE.

In one embodiment, the first downlink information comprises all fields of CSI-Process IE.

In one embodiment, the first field is a csi-RS-ConfigNZPId-r11 field.

In one embodiment, the second field is a csi-RS-ConfigNZPId-r11 field.

In one embodiment, the first radio resource comprises one or more of a time domain resource, a frequency domain resource or a code domain resource.

In one embodiment, the first radio resource comprises a Channel Status Information Reference Signal (CSI-RS) resource, the first node is a UE.

In one embodiment, the first radio resource comprises a Sounding reference signal (SRS) resource, the first node is a base station.

In one embodiment, the first radio resource comprises a positive integer number of non-consecutive time units in time domain.

In one subembodiment of the above embodiment, the time unit is a subframe.

In one subembodiment of the above embodiment, the time unit is a slot.

In one subembodiment of the above embodiment, the time unit is 1 ms.

In one embodiment, the first radio resource comprises a positive integer number of consecutive time units in time domain.

In one embodiment, the second radio resource comprises one or more of a time domain resource, a frequency domain resource or a code domain resource.

In one embodiment, the second radio resource comprises an SRS resource, the first node is a UE.

In one embodiment, the second radio resource comprises a CSI-RS resource, the first node is a base station.

In one embodiment, the second radio resource comprises a positive integer number of non-consecutive time units in time domain.

In one embodiment, the second radio resource comprises a positive integer number of consecutive time units in time domain.

In one embodiment, the first-type reference signal includes a CSI-RS, the first node is a UE.

In one embodiment, the second-type reference signal includes an SRS, the first node is a UE.

In one embodiment, the first-type reference signal includes an SRS, the first node is a base station.

In one embodiment, the second-type reference signal includes a CSI-RS, the first node is a base station.

In one embodiment, the first radio resource occurs multiple times in time domain, and any two adjacent occurrences of the first radio resource in time domain are spaced by an equal time interval.

In one embodiment, the second radio resource occurs multiple times in time domain, and any two adjacent occurrences of the second radio resource in time domain are spaced by an equal time interval.

In one embodiment, the first radio resource and the second radio resource configured by the same IE are connected. The embodiment is advantageous in conserving configuration signaling overhead.

In one subembodiment of the above embodiment, the phrase that "the first radio resource and the second radio resource configured by the same IE are connected" means that a time domain resource occupied by the first radio resource configured by a given IE is connected to a time domain resource occupied by the second radio resource configured by the given IE. The given IE is any of the IE.

In one subembodiment of the above embodiment, the phrase that "the first radio resource and the second radio resource configured by the same IE are connected" means that a time interval between any two adjacent occurrences of the first radio resource configured by a given IE in time domain is equal to a time interval between any two adjacent occurrences of the second radio resource configured by the given IE in time domain. The given IE is any of the IE.

In one subembodiment of the above embodiment, the phrase that "the first radio resource and the second radio resource configured by the same IE are connected" means that a time interval between any two adjacent occurrences of the first radio resource configured by a given IE in time domain is a positive integral multiple of a time interval between any two adjacent occurrences of the second radio resource configured by the given IE in time domain. The given IE is any of the IE.

In one subembodiment of the above embodiment, the phrase that "the first radio resource and the second radio resource configured by the same IE are connected" means that a time interval between any two adjacent occurrences of the second radio resource configured by a given IE in time domain is a positive integral multiple of a time interval between any two adjacent occurrences of the first radio resource configured by the given IE in time domain.

In one subembodiment of the above embodiment, the phrase that "the first radio resource and the second radio resource configured by the same IE are connected" means that a frequency domain resource occupied by the first radio resource configured by a given IE is connected to a frequency domain resource occupied by the second radio resource configured by the given IE. The given IE is any of the IE.

In one embodiment, the first radio resource occurs only once in time domain.

In one embodiment, the second radio resource occurs only once in time domain.

In one embodiment, the first downlink information is transmitted on a downlink physical layer data channel (i.e., a downlink channel that can be used for carrying physical layer data).

In one subembodiment of the above embodiment, the downlink physical layer data channel is a Physical Downlink Shared CHannel (PDSCH).

In one subembodiment of the above embodiment, the downlink physical layer data channel is a short PDSCH (sPDSCH).

In one subembodiment of the above embodiment, the downlink physical layer data channel is a New Radio PDSCH (NR-PDSCH).

In one embodiment, the phrase that "a measurement on the first-type reference signal is used for generating the second-type reference signal" means that a measurement on the first-type reference signal is used for determining a positive integer number of second-type antenna port set(s), the second-type reference signal is transmitted respectively by the positive integer number of second-type antenna port set(s). Any of the positive integer number of second-type antenna port set(s) comprises a positive integer number of second-type antenna port(s).

In one embodiment, the phrase that "a measurement on the first-type reference signal is used for generating the second-type reference signal" means that a measurement on the first-type reference signal is used for determining a positive integer number of beamforming vector(s), the positive integer number of beamforming vector(s) is(are) respectively used for transmitting the second-type reference signal.

According to one aspect of the present disclosure, comprising:

operating Q1 piece(s) of second downlink information and Q2 piece(s) of third downlink information;

herein, the Q1 piece(s) of second downlink information is(are) respectively used for determining Q1 first-type radio resource(s) and Q1 first-type identifier(s), the Q1 first-type identifier(s) respectively corresponds(correspond) to the Q1 first-type radio resource(s), the first field of the first downlink information is used for determining a first identifier, the first radio resource is one of the Q1 first-type radio resource(s), a first-type identifier of the Q1 first-type identifier(s) corresponding to the first radio resource is the first identifier; the Q2 piece(s) of third downlink information is(are) respectively used for determining Q2 second-type radio resource(s) and Q2 second-type identifier(s), the Q2 second-type identifier(s) respectively corresponds(correspond) to the Q2 second-type radio resource(s), the second field of the first downlink information is used for determining a second identifier, the second radio resource is one of the Q2 second-type radio resource(s), a second-type identifier of the Q2 second-type identifier(s) corresponding to the second radio resource is the second identifier; the Q1 and the Q2 are positive integers respectively; the first node is a UE, and the operating is receiving, or the first node is the base station, and the operating is transmitting.

In one embodiment, an advantage of the above method is that by pre-configuring the second downlink information and the third downlink information and identifying a plurality of first-type radio resources and second-type radio resources, a first-type identifier and a second-type identifier can be used flexibly in the first downlink information for choosing the first radio resource and the second radio resource from a plurality of first-type radio resources and second-type radio resources, thus striking a balance between overhead and flexibility.

In one embodiment, the second downlink information is carried by a higher layer signaling.

In one embodiment, the second downlink information is carried by an RRC signaling.

In one embodiment, the third downlink information is carried by a higher layer signaling.

In one embodiment, the third downlink information is carried by an RRC signaling.

In one embodiment, the second downlink information is an IE.

In one embodiment, the second downlink information is a CSI-RS-Config IE, and the first node is a UE.

In one embodiment, the second downlink information is a SoundingRS-UL-Config IE, and the first node is a base station.

In one embodiment, the third downlink information is an IE.

In one embodiment, the third downlink information is a SoundingRS-UL-Config IE, and the first node is a UE.

In one embodiment, the third downlink information is a CSI-RS-Config IE, and the first node is a base station.

In one embodiment, the first field of the first downlink information indicates the first identifier.

In one embodiment, the second field of the first downlink information indicates the second identifier.

In one embodiment, any of the Q1 first-type identifier(s) is a non-negative integer.

In one embodiment, any of the Q2 second-type identifier(s) is a non-negative integer.

In one embodiment, the first identifier is a non-negative integer.

In one embodiment, the second identifier is a non-negative integer.

In one embodiment, the second downlink information comprises a sixth field, the sixth field of the second downlink information indicates a corresponding first-type identifier.

In one embodiment, the third downlink information comprises a seventh field, the seventh field of the third downlink information indicates a corresponding second-type identifier.

In one embodiment, any of the Q1 first-type radio resource(s) comprises one or more of a time domain resource, a frequency domain resource or a code domain resource.

In one embodiment, any of the Q1 first-type radio resource(s) comprises a CSI-RS resource, the first node is a UE.

In one embodiment, any of the Q1 first-type radio resource(s) comprises an SRS resource, the first node is a base station.

In one embodiment, any of the Q2 second-type radio resource(s) comprises one or more of a time domain resource, a frequency domain resource or a code domain resource.

In one embodiment, any of the Q2 second-type radio resource(s) comprises an SRS resource, the first node is a UE.

In one embodiment, any of the Q2 second-type radio resource(s) comprises a CSI-RS resource, the first node is a base station.

In one embodiment, the second downlink information is transmitted on a downlink physical layer data channel (i.e., a downlink channel that can be used for carrying physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one embodiment, the third downlink information is transmitted on a downlink physical layer data channel (i.e., a downlink channel that can be used for carrying physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

According to one aspect of the present disclosure, comprising:

operating a downlink signaling;

herein, the downlink signaling is used for triggering a transmission of at least one of the first-type reference signal or the second-type reference signal, the first node is a UE, and the operating is receiving; or the first node is a base station, and the operating is transmitting.

In one embodiment, the downlink signaling is a Medium Access Control layer Control Element (MAC CE) signaling.

In one embodiment, the downlink signaling is a physical layer signaling.

In one embodiment, the downlink signaling is transmitted on a downlink physical layer data channel (i.e., a downlink channel that can be used for carrying physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one embodiment, the downlink signaling is transmitted on a downlink physical layer control channel (i.e., a downlink channel that can be used for carrying a physical layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

According to one aspect of the present disclosure, comprising:

receiving the first-type reference signal in the first radio resource; and transmitting the second-type reference signal in the second radio resource;

herein, the first radio resource comprises M first sub-resource(s), the first-type reference signal is transmitted by M first-type antenna port set(s) respectively in the M first sub-resource(s); the second radio resource comprises K second sub-resource(s), the second-type reference signal is transmitted by K second-type antenna port set(s) respectively in the K second sub-resource(s); any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively.

In one embodiment, a measurement on the first-type reference signal is used for determining the K second-type antenna port set(s).

In one embodiment, time domain resources occupied by any two of the M first sub-resources are orthogonal (non-overlapping).

In one embodiment, time domain resources occupied by at least two of the M first sub-resources are orthogonal (non-overlapping).

In one embodiment, at least two of the M first sub-resources occupy a same time domain resource.

In one embodiment, time domain resources occupied by any two of the K second sub-resources are orthogonal (non-overlapping).

In one embodiment, time domain resources occupied by at least two of the K second sub-resources are orthogonal (non-overlapping).

In one embodiment, at least two of the K second sub-resources occupy a same time domain resource.

In one embodiment, any given first-type antenna port of the positive integer number of first-type antenna port(s) is formed by superposition of multiple first-type antennas through antenna virtualization, mapping coefficients from the multiple first-type antennas to the any given first-type antenna port constitute a first-type beamforming vector corresponding to the any given first-type antenna port. A first-type beamforming vector is composed by a Kronecker product of a first-type analog beamforming vector and a first-type digital beamforming vector. The multiple first-type antennas are antennas configured by a transmitter of the first-type reference signal.

In one embodiment, different first-type antenna ports in any of the M first-type antenna port set(s) correspond to a same first-type analog beamforming vector.

In one embodiment, different first-type antenna ports in any of the M first-type antenna port set(s) correspond to different first-type digital beamforming vectors.

In one embodiment, different first-type antenna ports of the M first-type antenna port sets correspond to different first-type analog beamforming vectors.

In one embodiment, at least one first-type antenna port set of the M first-type antenna port set(s) comprises a first-type antenna port, and a first-type digital beamforming vector corresponding to the first-type antenna port is equal to 1.

In one embodiment, at least one first-type antenna port set of the M first-type antenna port set(s) comprises multiple first-type antenna ports.

In one embodiment, any two different first-type antenna port sets of the M first-type antenna port sets comprise a same number of first-type antenna ports.

In one embodiment, at least two different first-type antenna port sets of the M first-type antenna port sets comprise different numbers of first-type antenna ports.

In one embodiment, any given second-type antenna port of the positive integer number of second-type antenna port(s) is formed by superposition of multiple second-type antennas through antenna virtualization, mapping coefficients from the multiple second-type antennas to the any given second-type antenna port constitute a second-type beamforming vector corresponding to the any given second-type antenna port. A second-type beamforming vector is composed by a Kronecker product of a second-type analog beamforming vector and a second-type digital beamforming vector. The multiple second-type antennas are antennas configured by the first node.

In one embodiment, different second-type antenna ports in any of the K second-type antenna port set(s) correspond to a same second-type analog beamforming vector.

In one embodiment, different second-type antenna ports in any of the K second-type antenna port set(s) correspond to different second-type digital beamforming vectors.

In one embodiment, different second-type antenna ports of the K second-type antenna port sets correspond to different second-type analog beamforming vectors.

In one embodiment, at least one second-type antenna port set of the K second-type antenna port set(s) comprises a second-type antenna port, and a second-type digital beamforming vector corresponding to the second-type antenna port is equal to 1.

In one embodiment, at least one second-type antenna port set of the K second-type antenna port set(s) comprises multiple second-type antenna ports.

In one embodiment, any two different second-type antenna port sets of the K second-type antenna port sets comprise a same number of second-type antenna ports.

In one embodiment, at least two different second-type antenna port sets of the K second-type antenna port sets comprise different numbers of second-type antenna ports.

In one embodiment, the first-type reference signal comprises M first-type sub-signal(s), the M first-type sub-signal(s) is(are) respectively transmitted by the M first-type antenna port set(s) in the M first sub-resource(s).

In one embodiment, measurement(s) on K1 first-type sub-signal(s) is(are) respectively used for determining K1 reference vector(s), the K1 reference vector(s) is(are) used for determining K second-type analog beamforming vector(s), the K second-type analog beamforming vector(s) is(are) respectively second-type analog beamforming vector(s) corresponding to the K second-type antenna port set(s). The K1 first-type sub-signal(s) is(are) a subset of the M first-type sub-signal(s), the K1 is a positive integer no greater than M and no greater than K.

In one subembodiment of the above embodiment, measurement(s) on the M first-type sub-signal(s) is(are) respectively used for determining M first measurement value(s), the K1 first-type sub-signal(s) is(are) first-type sub-signal(s) of the M first-type sub-signal(s) corresponding to the greatest K1 first measurement value(s) of the M first measurement value(s).

In one subembodiment of the above embodiment, measurement(s) on the M first-type sub-signal(s) is(are) respectively used for determining M reference vector(s), the K1 reference vector(s) is(are) a subset of the M reference vector(s). Any of the M reference vector(s) belongs to an antenna virtualization vector set, the antenna virtualization vector set comprises a positive integer number of antenna virtualization vector(s).

In one subembodiment of the above embodiment, for any given first-type sub-signal of the M first-type sub-signal(s), the received quality of the given first-type sub-signal when received employing a corresponding reference vector is higher than the received quality of the given first-type sub-signal when received employing any other antenna virtualization vector of the antenna virtualization vector set.

In a reference embodiment of the above subembodiment, the received quality is a Channel Quality Indicator (CQI).

In a reference embodiment of the above subembodiment, the received quality is Reference Signal Received Power (RSRP).

In a reference embodiment of the above subembodiment, the received quality is Reference Signal Received Quality (RSRQ).

In one subembodiment of the above embodiment, any of the M first measurement value(s) is a received quality acquired by receiving a corresponding first-type sub-signal with a corresponding reference vector.

In one subembodiment of the above embodiment, the K1 is equal to the K, the K second-type analog beamforming vector(s) is(are) respectively equal to the K1 reference vector(s).

In one subembodiment of the above embodiment, the K1 is less than the K, K1 second-type analog beamforming vector(s) out of the K second-type analog beamforming vectors is(are) respectively equal to the K1 reference vector(s).

In one embodiment, the second-type reference signal comprises K second-type sub-signal(s), the K second-type sub-signal(s) is(are) respectively transmitted by the K second-type antenna port set(s) in the K second sub-resource(s).

According to one aspect of the present disclosure, comprising:

transmitting first information;

herein, a measurement on the first-type reference signal is used for determining the first information; the first information is used for determining whether the K second-type antenna port set(s) needs(need) to be updated; the first downlink information comprises a third field, the third field of the first downlink information is used for determining a third radio resource, the first information is transmitted in the third radio resource; the first node is a UE.

In one embodiment, an advantage of the above method is that by utilizing the channel reciprocity, it will be easier to notice every need of updates of the K second-type antenna port set(s) based on a measurement on the first-type reference signal, and the first information can be used for reporting the message to the transmitter of the first downlink information, so as to make sure that the transmitter of the first downlink information is able to adjust the configuration of the second-type reference signal accordingly, thereby guaranteeing the reliability of channel estimation based on the second-type reference signal.

In one embodiment, an advantage of the above method is that configurating the first radio resource, the second radio resource and the third radio resource with a same IE saves configuration signaling overhead.

In one embodiment, the first information includes Uplink Control Information (UCI).

In one subembodiment of the above embodiment, the UCI comprises at least one of HARQ-Acknowledgement (HARQ-ACK), Channel State Information (CSI), a Rank Indicator (RI), a Channel Quality Indicator (CQI), a Precoding Matrix Indicator (PMI), or a Channel-state information reference signals Resource Indicator (CRI).

In one embodiment, the first information comprises an SRS Resource Indicator (SRI).

In one embodiment, the first information comprises a first parameter, when the first parameter is equal to a first value, the K second-type antenna port set(s) need not be updated; when the first parameter is not equal to the first value, the K second-type antenna port set(s) need updating. The first parameter and the first value are non-negative integers, respectively.

In one subembodiment of the above embodiment, if the first parameter is equal to 0, the K second-type antenna port set(s) need not be updated; if the first parameter is equal to 1, the K second-type antenna port set(s) need to be updated.

In one subembodiment of the above embodiment, if the first parameter is equal to 1, the K second-type antenna port set(s) need not be updated; if the first parameter is equal to 0, the K second-type antenna port set(s) need to be updated.

In one embodiment, the first information is transmitted on an uplink physical layer control channel (i.e., an uplink channel that can only be used for carrying a physical layer signaling).

In one subembodiment of the above embodiment, the uplink physical layer control channel is a Physical Uplink Control CHannel (PUCCH).

In one subembodiment of the above embodiment, the uplink physical layer control channel is a short PUCCH (sPUCCH).

In one subembodiment of the above embodiment, the uplink physical layer control channel is a New Radio PUCCH (NR-PUCCH).

In one embodiment, the first information is transmitted on an uplink physical layer data channel (i.e., an uplink channel that can be used for carrying physical layer data).

In one subembodiment of the above embodiment, the uplink physical layer data channel is a Physical Uplink Shared CHannel (PUSCH).

In one subembodiment of the above embodiment, the uplink physical layer data channel is a short PUSCH (sPUSCH).

In one subembodiment of the above embodiment, the uplink physical layer data channel is a New Radio PUSCH (NR-PUSCH).

In one embodiment, a measurement on the first-type reference signal is used for determining K1 reference vector(s). When the K1 reference vector(s) is(are) subjected to change, the first information is used for determining that the K second-type antenna port set(s) needs(need) updating; or when the K1 reference vector(s) stays(stay) unchanged, the first information is used for determining that the K second-type antenna port set(s) needs(need) not be updated.

In one embodiment, the third radio resource comprises one or more of a time domain resource, a frequency domain resource or a code domain resource.

In one embodiment, the third radio resource occurs multiple times in time domain, and any two adjacent occurrences of the third radio resource in time domain are spaced by an equal time interval.

In one embodiment, the first radio resource and the third radio resource configured by the same IE are connected. The embodiment is advantageous in that the overhead of the configuration signaling can be conserved.

In one subembodiment of the above embodiment, the phrase that "the first radio resource and the third radio resource configured by the same IE are connected" means that a time domain resource occupied by the first radio resource configured by a given IE is connected to a time domain resource occupied by the third radio resource configured by the given IE. The given IE is any of the IE.

In one subembodiment of the above embodiment, the phrase that "the first radio resource and the third radio resource configured by the same IE are connected" means that a time interval between any two adjacent occurrences of the first radio resource configured by a given IE in time domain is equal to a time interval between any two adjacent occurrences of the third radio resource configured by the given IE in time domain. The given IE is any of the IE.

In one subembodiment of the above embodiment, the phrase that "the first radio resource and the third radio resource configured by the same IE are connected" means that a time interval between any two adjacent occurrences of the first radio resource configured by a given IE in time domain is a positive integral multiple of a time interval between any two adjacent occurrences of the third radio resource configured by the given IE in time domain. The given IE is any of the IE.

In one subembodiment of the above embodiment, the phrase that "the first radio resource and the third radio resource configured by the same IE are connected" means that a time interval between any two adjacent occurrences of the third radio resource configured by a given IE in time domain is a positive integral multiple of a time interval between any two adjacent occurrences of the first radio resource configured by the given IE in time domain.

In one subembodiment of the above embodiment, the phrase that "the first radio resource and the third radio resource configured by the same IE are connected" means that a frequency domain resource occupied by the first radio resource configured by a given IE is connected to a frequency domain resource occupied by the third radio resource configured by the given IE. The given IE is any of the IE.

In one embodiment, the third radio resource occurs only once in time domain.

In one embodiment, the first downlink information comprises a fifth field, the fifth field of the first downlink information is used for determining a fourth radio resource, the first node receives a third-type reference signal in the fourth radio resource, a measurement on the first-type reference signal and a measurement on the third-type reference signal are used for determining the first information.

In one subembodiment of the above embodiment, the fourth radio resource comprises one or more of a time domain resource, a frequency domain resource or a code resource.

In one subembodiment of the above embodiment, the third-type reference signal comprises one or more of Zero Power (ZP) CSI-RS, Non Zero Power (NZP), CSI-RS or DeModulation Reference Signals (DMRS).

In one subembodiment of the above embodiment, the fifth field of the first downlink information is a csi-IM-ConfigId-r11 field, the first downlink information is a CSI-Process IE.

According to one aspect of the present disclosure, comprising:
    operating fourth downlink information;
    herein, a measurement on the first-type reference signal is used for at least one of triggering the fourth downlink information or generating the fourth downlink information, the first node is a base station, and the operating is transmitting; or the first information is used for triggering the fourth downlink information, the first node is a UE, and the operating is receiving; the fourth downlink information is used for reconfiguration of at least the latter of the first radio resource and the second radio resource.

In one embodiment, an advantage of the above method is that soon after a measurement on the first-type reference signal or the first information discovers the need of updates of the K second-type antenna port set(s), the fourth downlink information will immediately be transmitted to update the configuration of the second-type reference signal, thus ensuring the reliability of channel estimation based on the second-type reference signal.

In one embodiment, the fourth downlink information is carried by a higher layer signaling.

In one embodiment, the fourth downlink information is carried by an RRC signaling.

In one embodiment, the fourth downlink information is the IE.

In one embodiment, both of the first downlink information and the fourth downlink information comprises a fourth field, a value of the fourth field of the first downlink information is equal to a value of the fourth field of the fourth downlink information.

In one embodiment, the fourth field is a csi-ProcessId-r11 field.

In one embodiment, the fourth downlink information is an IE.

In one embodiment, both of the first downlink information and the fourth downlink information are CSI-Process IE.

In one embodiment, the fourth downlink information comprises all fields of a CSI-Process IE.

In one embodiment, the phrase that a measurement on the first-type reference signal is used for generating the fourth downlink information means that the measurement on the first-type reference signal is used for determining the K, the fourth downlink information indicates the K.

In one subembodiment of the above embodiment, the fourth downlink information implicitly indicates the K.

In one subembodiment of the above embodiment, the fourth downlink information explicitly indicates the K.

In one embodiment, the phrase that a measurement on the first-type reference signal is used for generating the fourth downlink information means that the measurement on the first-type reference signal is used for determining the K second-type antenna port set(s), the fourth downlink information indicates the K second-type antenna port set(s).

In one subembodiment of the above embodiment, the fourth downlink information implicitly indicates the K second-type antenna port set(s).

In one subembodiment of the above embodiment, the fourth downlink information explicitly indicates the K second-type antenna port set(s).

In one embodiment, a measurement on the first-type reference signal is used for determining K1 reference vector(s). When the K1 reference vector(s) is(are) subjected to change, a transmission of the fourth downlink information is triggered; or the K1 reference vector(s) stays(stay) unchanged, the transmission of the fourth downlink information is not triggered.

In one subembodiment of the above embodiment, the K1 is a positive integer no greater than K.

In one subembodiment of the above embodiment, the K1 is used for determining K.

In one subembodiment of the above embodiment, the K1 reference vector(s) is(are) used for determining the K second-type antenna port set(s).

In one embodiment, a transmission of the fourth downlink information is triggered, the first information is used for determining that the K second-type antenna port set(s) needs(need) updating.

In one embodiment, a transmission of the fourth downlink information is not triggered, the first information is used for determining that the K second-type antenna port set(s) needs(need) not be updated.

In one embodiment, the fourth downlink information is used for re-configuring the second radio resource.

In one embodiment, the fourth downlink information is used for re-configuring the first radio resource and the second radio resource.

In one embodiment, the fourth downlink information is also used for re-configuring the third radio resource.

According to one aspect of the present disclosure, wherein the first-type reference signal is a Channel Status Information Reference Signal (CSI-RS), the second-type reference signal is a Sounding Reference Signal (SRS), the first node is a UE.

According to one aspect of the present disclosure, wherein the first-type reference signal is an SRS, the second-type reference signal is a CSI-RS, the first node is a base station.

According to one aspect of the present disclosure, wherein the first downlink information comprises a fourth field, the fourth field of the first downlink information is used for identifying the IE corresponding to the first downlink information.

In one embodiment, a value of the fourth field of the first downlink information is equal to a value of the fourth field of the fourth downlink information, both of the first downlink information and the fourth downlink information are the IE.

In one embodiment, the fourth field is a csi-ProcessId-r11 field, and the IE is a CSI-Process IE.

In one embodiment, a value of the fourth field is a non-negative integer.

The present disclosure provides a method in a second node for multi-antenna transmission, comprising:
  executing first downlink information;
  herein, the first downlink information is an information element, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a transmitter of the first-type reference signal is the second node, a target receiver of the second-type reference signal comprises the second node; a measurement on the first-type reference signal is used for generating the second-type reference signal; the second node is a base station and the executing is transmitting, or the second node is a UE and the executing is receiving.

In one embodiment, the IE is a CSI-Process IE.

In one embodiment, the first field is a csi-RS-ConfigNZPId-r11 field.

In one embodiment, the second field is a csi-RS-ConfigNZPId-r11 field.

In one embodiment, the first radio resource comprises a CSI-RS resource, the second node is a base station.

In one embodiment, the first radio resource comprises an SRS resource, the second node is a UE.

In one embodiment, the first-type reference signal comprises a CSI-RS, the second node is a base station.

In one embodiment, the second-type reference signal comprises an SRS, the second node is a base station.

In one embodiment, the first-type reference signal comprises an SRS, the second node is a UE.

In one embodiment, the second-type reference signal comprises a CSI-RS, the second node is a UE.

In one embodiment, the first radio resource and the second radio resource configured by the same IE are connected.

According to one aspect of the present disclosure, comprising:
  executing Q1 piece(s) of second downlink information and Q2 piece(s) of third downlink information;
  herein, the Q1 piece(s) of second downlink information is(are) respectively used for determining Q1 first-type radio resource(s) and Q1 first-type identifier(s), the Q1 first-type identifier(s) respectively corresponds(correspond) to the Q1 first-type radio resource(s), the first field of the first downlink information is used for determining a first identifier, the first radio resource is one of the Q1 first-type radio resource(s), a first-type identifier of the Q1 first-type identifier(s) corresponding to the first radio resource is the first identifier; the Q2 piece(s) of third downlink information is(are) respectively used for determining Q2 second-type radio resource(s) and Q2 second-type identifier(s), the Q2 second-type identifier(s) respectively corresponds(correspond) to the Q2 second-type radio resource(s), the second field of the first downlink information is used for determining a second identifier, the second radio resource is one of the Q2 second-type radio resource(s), a second-type identifier of the Q2 second-type identifier(s) corresponding to the second radio resource is the second identifier; the Q1 and the Q2 are positive integers respectively; the second node is the base station and the executing is transmitting, or the second node is the UE and the executing is receiving.

In one embodiment, the second downlink information is an IE.

In one embodiment, the second downlink information is a CSI-RS-Config IE, the second node is a base station.

In one embodiment, the second downlink information is a SoundingRS-UL-Config IE, the second node is a UE.

In one embodiment, the third downlink information is an IE.

In one embodiment, the third downlink information is a CSI-RS-Config IE, the second node is a base station.

In one embodiment, the third downlink information is a SoundingRS-UL-Config IE, the second node is a UE.

According to one aspect of the present disclosure, comprising:
  executing a downlink signaling;
  herein, the downlink signaling is used for triggering a transmission of at least one of the first-type reference signal or the second-type reference signal; the second node is a base station and the executing is transmitting, or the second node is a UE and the executing is receiving.

According to one aspect of the present disclosure, comprising:
  transmitting the first-type reference signal in the first radio resource; and
  receiving the second-type reference signal in the second radio resource;
  herein, the first radio resource comprises M first sub-resource(s), the first-type reference signal is transmitted by M first-type antenna port set(s) respectively in the M first sub-resource(s); the second radio resource comprises K second sub-resource(s), the second-type reference signal is transmitted by K second-type antenna port set(s) respectively in the K second sub-resource(s); any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively.

In one embodiment, a measurement on the first-type reference signal is used for determining the K second-type antenna port set(s).

In one embodiment, any given first-type antenna port of the positive integer number of first-type antenna port(s) is formed by superposition of multiple first-type antennas through antenna virtualization, mapping coefficients from the multiple first-type antennas to the any given first-type antenna port constitute a first-type beamforming vector corresponding to the any given first-type antenna port. A first-type beamforming vector is composed by a Kronecker product of a first-type analog beamforming vector and a first-type digital beamforming vector. The multiple first-type antennas are antennas configured by the second node.

In one embodiment, any given second-type antenna port of the positive integer number of second-type antenna port(s) is formed by superposition of multiple second-type antennas through antenna virtualization, mapping coefficients from the multiple second-type antennas to the any given second-type antenna port constitute a second-type beamforming vector corresponding to the any given second-type antenna port. A second-type beamforming vector is composed by a Kronecker product of a second-type analog beamforming vector and a second-type digital beamforming vector. The multiple second-type antennas are antennas configured by a transmitter of the second-type reference signal.

According to one aspect of the present disclosure, comprising:

receiving first information;

herein, a measurement on the first-type reference signal is used for determining the first information; the first information is used for determining whether the K second-type antenna port set(s) needs(need) to be updated; the first downlink information comprises a third field, the third field of the first downlink information is used for determining a third radio resource, the first information is transmitted in the third radio resource; the second node is a base station.

In one embodiment, the first radio resource and the third radio resource configured by the same IE are connected.

According to one aspect of the present disclosure, comprising:

executing fourth downlink information;

herein, a measurement on the first-type reference signal is used for at least one of triggering the fourth downlink information or generating the fourth downlink information, the second node is a UE and the executing is receiving; or the first information is used for triggering the fourth downlink information, the second node is a base station and the executing is transmitting; the fourth downlink information is used for reconfiguration of at least the latter of the first radio resource and the second radio resource.

In one embodiment, the fourth downlink information is the IE.

In one embodiment, the fourth field is a csi-ProcessId-r11 field.

In one embodiment, both of the first downlink information and the fourth downlink information are CSI-Process IE.

According to one aspect of the present disclosure, wherein the first-type reference signal is a CSI-RS, the second-type reference signal is an SRS, the second node is a base station.

According to one aspect of the present disclosure, wherein the first-type reference signal is an SRS, the second-type reference signal is a CSI-RS, the second node is a UE.

According to one aspect of the present disclosure, wherein the first downlink information comprises a fourth field, the fourth field of the first downlink information is used for identifying the IE corresponding to the first downlink information.

In one embodiment, a value of the fourth field of the first downlink information is equal to a value of the fourth field of the fourth downlink information, both of the first downlink information and the fourth downlink information are the IE.

The present disclosure provides a device in a first node for multi-antenna transmission, comprising:

a first processor, operating first downlink information;

herein, the first downlink information is an information element, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a target receiver of the first-type reference signal comprises the first node, a transmitter of the second-type reference signal is the first node; a measurement on the first-type reference signal is used for generating the second-type reference signal; the first node is a UE, and the operating is receiving, or the first node is a base station, and the operating is transmitting.

In one embodiment, the above device in the first node for multi-antenna transmission is characterized in that the first processor also operates Q1 piece(s) of second downlink information and Q2 piece(s) of third downlink information. Herein, the Q1 piece(s) of second downlink information is(are) respectively used for determining Q1 first-type radio resource(s) and Q1 first-type identifier(s), the Q1 first-type identifier(s) respectively corresponds(correspond) to the Q1 first-type radio resource(s), the first field of the first downlink information is used for determining a first identifier, the first radio resource is one of the Q1 first-type radio resource(s), a first-type identifier of the Q1 first-type identifier(s) corresponding to the first radio resource is the first identifier. The Q2 piece(s) of third downlink information is(are) respectively used for determining Q2 second-type radio resource(s) and Q2 second-type identifier(s), the Q2 second-type identifier(s) respectively corresponds(correspond) to the Q2 second-type radio resource(s), the second field of the first downlink information is used for determining a second identifier, the second radio resource is one of the Q2 second-type radio resource(s), a second-type identifier of the Q2 second-type identifier(s) corresponding to the second radio resource is the second identifier. The Q1 and the Q2 are positive integers respectively. The first node is the UE, and the operating is receiving; or the first node is the base station, and the operating is transmitting.

In one embodiment, the above device in the first node for multi-antenna transmission is characterized in that the first processor also operates a downlink signaling. Herein, the downlink signaling is used for triggering a transmission of at least one of the first-type reference signal or the second-type reference signal. The first node is a UE, and the operating is receiving; or the first node is a base station, and the operating is transmitting.

In one embodiment, the above device in the first node for multi-antenna transmission is characterized in that the first-type reference signal is a CSI-RS, the second-type reference signal is an SRS, the first node is a UE.

In one embodiment, the above device in the first node for multi-antenna transmission is characterized in that the first-type reference signal is an SRS, the second-type reference signal is a CSI-RS, the first node is a base station.

In one embodiment, the above device in the first node for multi-antenna transmission is characterized in that the first downlink information comprises a fourth field, the fourth field of the first downlink information is used for identifying the IE corresponding to the first downlink information.

In one embodiment, the above device in the first node for multi-antenna transmission is characterized in comprising:
 a second processor, receiving the first-type reference signal in the first radio resource; and
 a third processor, transmitting the second-type reference signal in the second radio resource;
 herein, the first radio resource comprises M first sub-resource(s), the first-type reference signal is transmitted by M first-type antenna port set(s) respectively in the M first sub-resource(s). The second radio resource comprises K second sub-resource(s), the second-type reference signal is transmitted by K second-type antenna port set(s) respectively in the K second sub-resource(s). Any of the M first-type antenna port set(s) comprises a positive integer number of first-type antenna port(s), any of the K second-type antenna port set(s) comprises a positive integer number of second-type antenna port(s), the M and the K are positive integers respectively.

In one embodiment, the above device in the first node for multi-antenna transmission is characterized in that the second processor also transmits first information. Herein, a measurement on the first-type reference signal is used for determining the first information. The first information is used for determining whether the K second-type antenna port set(s) needs(need) to be updated. The first downlink information comprises a third field, the third field of the first downlink information is used for determining a third radio resource, the first information is transmitted in the third radio resource. The first node is a UE.

In one embodiment, the above device in the first node for multi-antenna transmission is characterized in that the third processor is also used for operating fourth downlink information. Herein, a measurement on the first-type reference signal is used for at least one of triggering the fourth downlink information or generating the fourth downlink information, the first node is a base station, and the operating is transmitting; or the first information is used for triggering the fourth downlink information, the first node is a UE, and the operating is receiving. The fourth downlink information is used for reconfiguration of at least the latter of the first radio resource and the second radio resource.

The present disclosure provides a device in a second node for multi-antenna transmission, comprising:
 a fourth processor, executing first downlink information;
 herein, the first downlink information is an information element, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a transmitter of the first-type reference signal is the second node, a target receiver of the second-type reference signal comprises the second node; a measurement on the first-type reference signal is used for generating the second-type reference signal; the second node is a base station and the executing is transmitting, or the second node is a UE and the executing is receiving.

In one embodiment, the above device in the second node for multi-antenna transmission is characterized in that the fourth processor also executes Q1 piece(s) of second downlink information and Q2 piece(s) of third downlink information. Herein, the Q1 piece(s) of second downlink information is(are) respectively used for determining Q1 first-type radio resource(s) and Q1 first-type identifier(s), the Q1 first-type identifier(s) respectively corresponds(correspond) to the Q1 first-type radio resource(s), the first field of the first downlink information is used for determining a first identifier, the first radio resource is one of the Q1 first-type radio resource(s), a first-type identifier of the Q1 first-type identifier(s) corresponding to the first radio resource is the first identifier. The Q2 piece(s) of third downlink information is(are) respectively used for determining Q2 second-type radio resource(s) and Q2 second-type identifier(s), the Q2 second-type identifier(s) respectively corresponds(correspond) to the Q2 second-type radio resource(s), the second field of the first downlink information is used for determining a second identifier, the second radio resource is one of the Q2 second-type radio resource(s), a second-type identifier of the Q2 second-type identifier(s) corresponding to the second radio resource is the second identifier. The Q1 and the Q2 are positive integers respectively. The second node is the base station and the executing is transmitting; or the second node is the UE and the executing is receiving.

In one embodiment, the above device in the second node for multi-antenna transmission is characterized in that the fourth processor also executes a downlink signaling. Herein, the downlink signaling is used for triggering a transmission of at least one of the first-type reference signal or the second-type reference signal. The second node is a base station and the executing is transmitting; or the second node is a UE and the executing is receiving.

In one embodiment, the above device in the second node for multi-antenna transmission is characterized in that the first-type reference signal is a CSI-RS, the second-type reference signal is an SRS, the second node is a base station.

In one embodiment, the above device in the second node for multi-antenna transmission is characterized in that the first-type reference signal is an SRS, the second-type reference signal is a CSI-RS, the second node is a UE.

In one embodiment, the above device in the second node for multi-antenna transmission is characterized in that the first downlink information comprises a fourth field, the fourth field of the first downlink information is used for identifying the IE corresponding to the first downlink information.

In one embodiment, the above device in the second node for multi-antenna transmission is characterized in comprising:
 a fifth processor, transmitting the first-type reference signal in the first radio resource; and
 a sixth processor, receiving the second-type reference signal in the second radio resource;
 herein, the first radio resource comprises M first sub-resource(s), the first-type reference signal is transmitted by M first-type antenna port set(s) respectively in the M first sub-resource(s); the second radio resource comprises K second sub-resource(s), the second-type reference signal is transmitted by K second-type antenna port set(s) respectively in the K second sub-resource(s); any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively.

In one embodiment, the above device in the second node for multi-antenna transmission is characterized in that the fifth processor also receives first information. Herein, a measurement on the first-type reference signal is used for determining the first information. The first information is used for determining whether the K second-type antenna port set(s) needs(need) to be updated. The first downlink information comprises a third field, the third field of the first downlink information is used for determining a third radio resource, the first information is transmitted in the third radio resource. The second node is a base station.

In one embodiment, the above device in the second node for multi-antenna transmission is characterized in that the sixth processor also executes fourth downlink information. Herein, a measurement on the first-type reference signal is used for at least one of triggering the fourth downlink information or generating the fourth downlink information, the second node is a UE and the executing is receiving; or the first information is used for triggering the fourth downlink information, the second node is a base station and the executing is transmitting. The fourth downlink information is used for reconfiguration of at least the latter of the first radio resource and the second radio resource.

In one embodiment, the present disclosure has the following advantages over conventional schemes:

By creating a connection between uplink and downlink reference signals, the channel reciprocity can be applied, and the direction of transmitting beamforming of uplink/downlink reference signal can be determined according to a measurement on the uplink/downlink signal, thereby reducing the overhead of uplink/downlink signal.

Uplink and downlink reference signals are configured by a same IE so that the overhead of a configuration signaling relevant to creating a connection between uplink and downlink reference signals are reduced.

Apart from configuring uplink and downlink reference signals, the same IE is also used for configuring a feedback channel, when the UE discovers based on a measurement on the downlink reference signal that the beamforming direction of a corresponding uplink reference signal needs to be updated, the feedback channel can report the message to the base station for responsive processing as quickly as possible.

When the base station learns from a measurement on an uplink reference signal or user feedback that the beamforming direction of downlink/uplink reference signal needs updating, the configuration of downlink/uplink reference signal can be immediately updated so as to ensure the reliability of downlink/uplink channel estimation.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Embodiment 1

Figure 1:
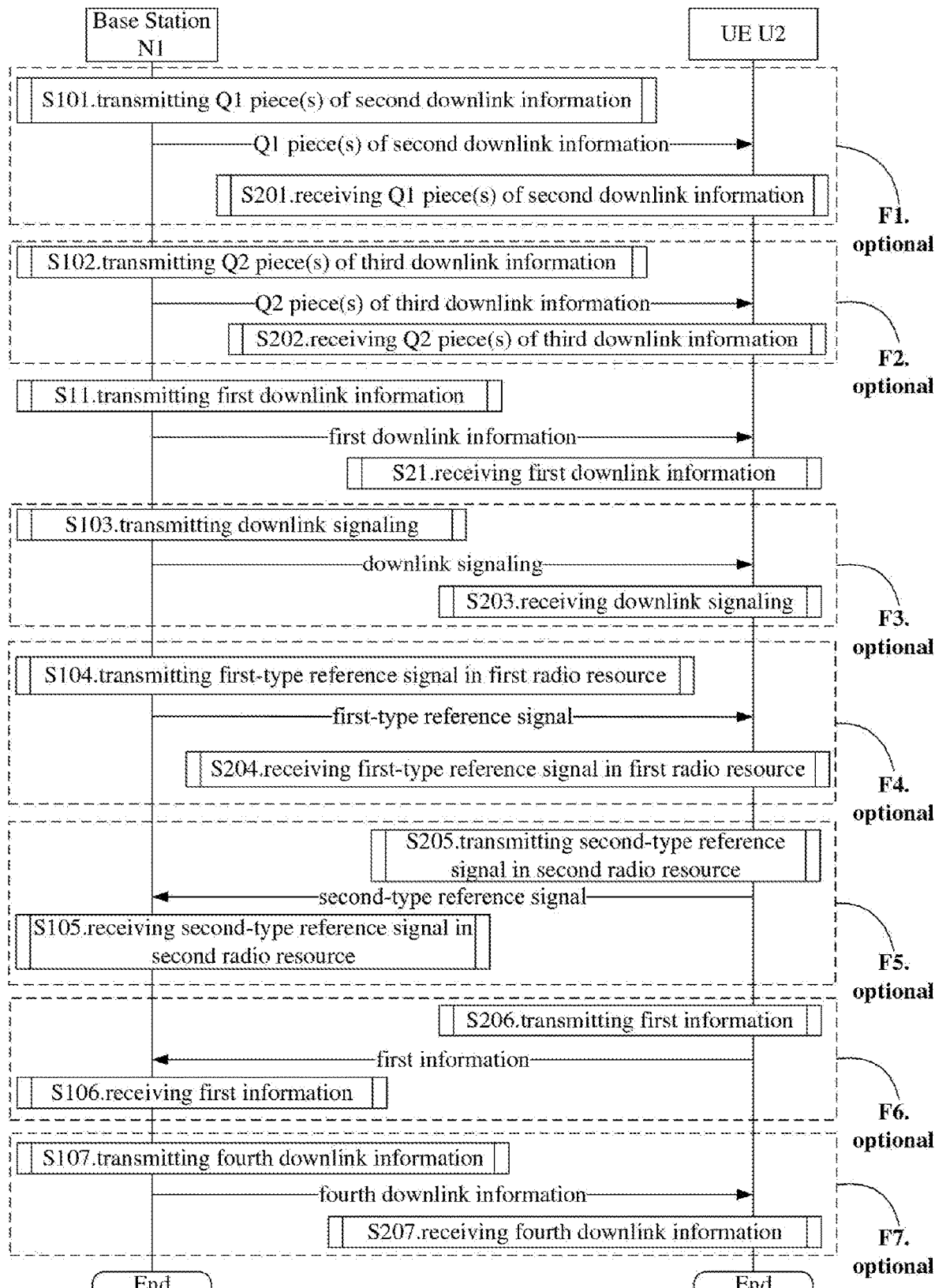
FIG. 1 illustrates a flowchart of wireless transmission according to one embodiment of the present disclosure.

Embodiment 1 illustrates a flowchart of wireless transmission, as shown in FIG. 1. In FIG. 1, a base station N1 is a maintenance base station for a serving cell of a UE U2. In FIG. 1, steps in box F1-F7 are optional, respectively.

The N1 transmits Q1 piece(s) of second downlink information in step S101; transmits Q2 piece(s) of third downlink information in step S102; transmits first downlink information in step S11; transmits a downlink signaling in step S103; transmits a first-type reference signal in a first radio resource in step S104; receives a second-type reference signal in a second radio resource in step S105; receives first information in step S106; and transmits fourth downlink information in step S107.

The U2 receives Q1 piece(s) of second downlink information in step S201; receives Q2 piece(s) of third downlink information in step S202; receives first downlink information in step S21; receives a downlink signaling in step S203; receives a first-type reference signal in a first radio resource in step S204; transmits a second-type reference signal in a second radio resource in step S205; transmits first information in step S206; and receives fourth downlink information in step S207.

In Embodiment 1, the first downlink information is an IE, the first downlink information comprises a first field and a second field, the first field of the first downlink information is used by the U2 for determining the first radio resource, the second field of the first downlink information is used by the U2 for determining the second radio resource. The first radio resource is reserved for a first-type reference signal, the second radio resource is reserved for a second-type reference signal. A transmitter of the first-type reference signal is the N1, a target receiver of the first-type reference signal comprises the U2, a transmitter of the second-type reference signal is the U2, a target receiver of the second-type reference signal comprises the N1; a measurement on the first-type reference signal is used by the U2 for generating the second-type reference signal. The Q1 piece(s) of second downlink information is(are) respectively used by the U2 for determining Q1 first-type radio resource(s) and Q1 first-type identifier(s), the Q1 first-type identifier(s) respectively corresponds(correspond) to the Q1 first-type radio resource(s), the first field of the first downlink information is used by the U2 for determining a first identifier, the first radio resource is one of the Q1 first-type radio resource(s), a first-type identifier of the Q1 first-type identifier(s) corresponding to the first radio resource is the first identifier. The Q2 piece(s) of third downlink information is(are) respectively used by the U2 for determining Q2 second-type radio resource(s) and Q2 second-type identifier(s), the Q2 second-type identifier(s) respectively corresponds(correspond) to the Q2 second-type radio resource(s), the second field of the first downlink information is used by the U2 for determining a second identifier, the second radio resource is one of the Q2 second-type radio resource(s), a second-type identifier of the Q2 second-type identifier(s) corresponding to the second radio resource is the second identifier. The Q1 and the Q2 are positive integers respectively. The downlink signaling is used for triggering a transmission of at least one of the first-type reference signal or the second-type reference signal. The first radio resource comprises M first sub-resource(s), the first-type reference signal is transmitted by M first-type antenna port set(s) respectively in the M first sub-resource(s). The second radio resource comprises K second sub-resource(s), the second-type reference signal is transmitted by K second-type antenna port set(s) respectively in the K second sub-resource(s). Any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively. A measurement on the first-type reference signal is used by the U2 for determining the first information. The first information is used by the N1 for determining whether the K second-type antenna port set(s) needs(need) to be updated. The first downlink information comprises a third field, the third field of the first downlink information is used by the U2 for determining a third radio resource, the first information is transmitted in the third radio resource. The first information is used for triggering the fourth downlink information, the fourth downlink information is used by the N1 for reconfiguration of at least the latter of the first radio resource and the second radio resource.

In one embodiment, the first downlink information is carried by a higher layer signaling.

In one embodiment, the first downlink information is carried by an RRC signaling.

In one embodiment, the IE is a CSI-Process IE.

In one embodiment, the first field is a csi-RS-ConfigNZPId-r11 field.

In one embodiment, the first radio resource comprises one or more of a time domain resource, a frequency domain resource or a code domain resource.

In one embodiment, the first radio resource comprises a CSI-RS resource.

In one embodiment, the second radio resource comprises one or more of a time domain resource, a frequency domain resource or a code domain resource.

In one embodiment, the second radio resource comprises an SRS resource.

In one embodiment, the first-type reference signal is a CSI-RS, and the second-type reference signal is an SRS.

In one embodiment, the first downlink information comprises a fourth field, the fourth field of the first downlink information is used for identifying the IE corresponding to the first downlink information.

In one subembodiment of the above embodiment, the fourth field is a csi-ProcessId-r11 field.

In one embodiment, the first radio resource occurs multiple times in time domain, and any two adjacent occurrences of the first radio resource in time domain are spaced by an equal time interval.

In one embodiment, the first radio resource occurs only once in time domain.

In one embodiment, the second radio resource occurs multiple times in time domain, and any two adjacent occurrences of the second radio resource in time domain are spaced by an equal time interval.

In one embodiment, the second radio resource occurs only once in time domain.

In one embodiment, the first radio resource and the second radio resource configured by the same IE are connected.

In one embodiment, the second downlink information is carried by a higher layer signaling.

In one embodiment, the second downlink information is carried by an RRC signaling.

In one embodiment, the third downlink information is carried by a higher layer signaling.

In one embodiment, the third downlink information is carried by an RRC signaling.

In one embodiment, the second downlink information is an IE.

In one embodiment, the second downlink information is a CSI-RS-Config IE.

In one embodiment, the third downlink information is an IE.

In one embodiment, the third downlink information is a CSI-RS-Config IE.

In one embodiment, the downlink signaling is a MAC CE signaling.

In one embodiment, the downlink signaling is a physical layer signaling.

In one embodiment, a measurement on the first-type reference signal is used by the U2 for determining the K second-type antenna port set(s).

In one embodiment, any given first-type antenna port of the positive integer number of first-type antenna port(s) is formed by superposition of multiple first-type antennas through antenna virtualization, mapping coefficients from the multiple first-type antennas to the any given first-type antenna port constitute a first-type beamforming vector corresponding to the any given first-type antenna port. A first-type beamforming vector is composed by a Kronecker product of a first-type analog beamforming vector and a first-type digital beamforming vector. The multiple first-type antennas are antennas configured by the N1.

In one embodiment, any given second-type antenna port of the positive integer number of second-type antenna port(s) is formed by superposition of multiple second-type antennas through antenna virtualization, mapping coefficients from the multiple second-type antennas to the any given second-type antenna port constitute a second-type beamforming vector corresponding to the any given second-type antenna port. A second-type beamforming vector is composed by a Kronecker product of a second-type analog beamforming vector and a second-type digital beamforming vector. The multiple second-type antennas are antennas configured by the U2.

In one embodiment, the first information comprises UCI.

In one subembodiment of the above embodiment, the UCI comprises at least one of HARQ-ACK, CSI, a RI, a CQI, a PMI, or a CRI.

In one embodiment, the first information comprises a first parameter, when the first parameter is equal to a first value, the K second-type antenna port set(s) needs(need) not be updated; or when the first parameter is unequal to the first value, the K second-type antenna port set(s) needs(need) updating. The first parameter and the first value are non-negative integers respectively.

In one embodiment, a measurement on the first-type reference signal is used by the U2 for determining the K second-type antenna port set(s). When the K second-type antenna port set(s) is(are) subjected to change, the first information indicates that the K second-type antenna port set(s) needs(need) updating; or when the K second-type antenna port set(s) stays(stay) unchanged, the first information indicates that the K second-type antenna port set(s) needs(need) not be updated.

In one embodiment, a measurement on the first-type reference signal is used by the U2 for determining K1 reference vector(s). When the K1 reference vector(s) is(are) subjected to change, the first information indicates that the K second-type antenna port set(s) needs(need) updating; or when the K1 reference vector(s) stays(stay) unchanged, the first information indicates that the K second-type antenna port set(s) needs(need) not be updated.

In one embodiment, the third radio resource comprises one or more of a time domain resource, a frequency domain resource or a code domain resource.

In one embodiment, the third radio resource occurs multiple times in time domain, and any two adjacent occurrences of the third radio resource in time domain are spaced by an equal time interval.

In one embodiment, the third radio resource occurs only once in time domain.

In one embodiment, the first radio resource and the third radio resource configured by the same IE are connected.

In one embodiment, the fourth downlink information is carried by a higher layer signaling.

In one embodiment, the fourth downlink information is carried by an RRC signaling.

In one embodiment, the fourth downlink information is the IE.

In one embodiment, both of the first downlink information and the fourth downlink information comprise a fourth field, a value of the fourth field of the first downlink information is equal to a value of the fourth field of the fourth downlink information.

In one embodiment, both of the first downlink information and the fourth downlink information are CSI-Process IE.

In one embodiment, a transmission of the fourth downlink information is triggered, the first information indicates that the K second-type antenna port set(s) needs(need) updating.

In one embodiment, a transmission of the fourth downlink information is not triggered, the first information indicates that the K second-type antenna port set(s) needs(need) not be updated.

In one embodiment, boxes F1-F7 in FIG. 1 all exist.

In one embodiment, boxes F1, F2, F4 and F5 in FIG. 1 exist, while boxes F3, F6 and F7 in FIG. 1 do not exist.

In one embodiment, boxes F1-F5 in FIG. 1 all exist, while box F6 and box F7 in FIG. 1 do not exist.

In one embodiment, boxes F1, F2, F4, F5 and F6 in FIG. 1 exist, while box F3 and box F7 in FIG. 1 do not exist.

In one embodiment, boxes F1, F2, F4, F5, F6 and F7 in FIG. 1 exist, while box F3 in FIG. 1 does not exist.

In one embodiment, boxes F1-F7 in FIG. 1 do not exist.

Embodiment 2

Figure 2:
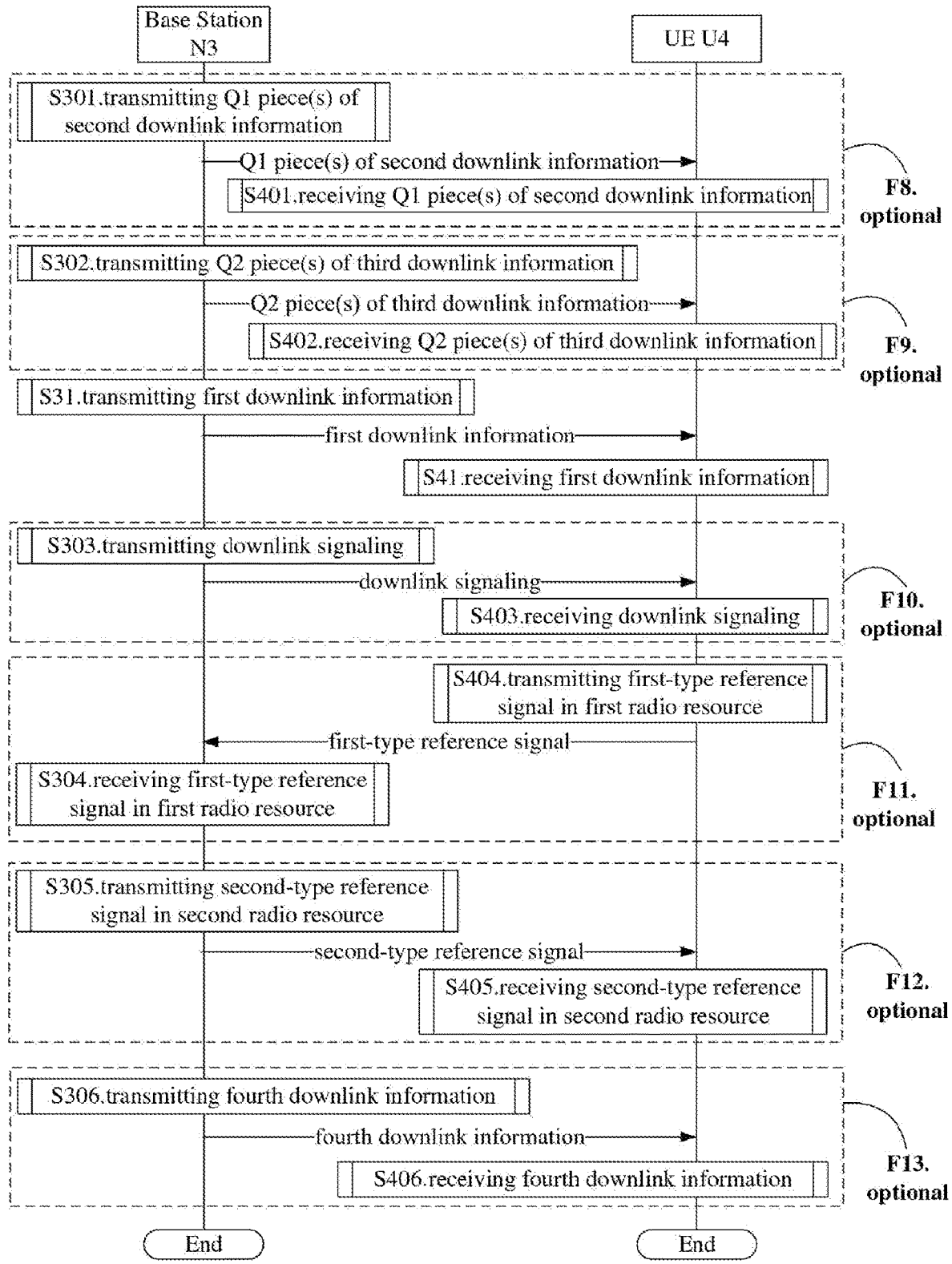
FIG. 2 illustrates a flowchart of wireless transmission according to another embodiment of the present disclosure.

Embodiment 2 illustrates a flowchart of wireless transmission, as shown in FIG. 2. In FIG. 2, a base station N3 is a maintenance base station for a serving cell of a UE U4. In FIG. 2, steps in boxes F8-F13 are optional respectively.

The N3 transmits Q1 piece(s) of second downlink information in step S301; transmits Q2 piece(s) of third downlink information in step S302; transmits first downlink information in step S31; transmits a downlink signaling in step S303; receives a first-type reference signal in a first radio resource in step S304; transmits a second-type reference signal in a second radio resource in step S305; and transmits fourth downlink information in step S306.

The U4 receives Q1 piece(s) of second downlink information in step S401; receives Q2 piece(s) of third downlink information in step S402; receives first downlink information in step S41; receives a downlink signaling in step S403; transmits a first-type reference signal in a first radio resource in step S404; receives a second-type reference signal in a second radio resource in step S405; and receives fourth downlink information in step S406.

In Embodiment 2, the first downlink information is an IE, the first downlink information comprises a first field and a second field, the first field of the first downlink information is used by the U4 or determining the first radio resource, the second field of the first downlink information is used by the U4 for determining the second radio resource. The first radio resource is reserved for a first-type reference signal, the second radio resource is reserved for a second-type reference signal. A transmitter of the first-type reference signal is the U4, a target receiver of the first-type reference signal comprises the N3, a transmitter of the second-type reference signal is the N3, a target receiver of the second-type reference signal comprises the U4. A measurement on the first-type reference signal is used by the N3 for generating the second-type reference signal. The Q1 piece(s) of second downlink information is(are) respectively used by the U4 for determining Q1 first-type radio resource(s) and Q1 first-type identifier(s), the Q1 first-type identifier(s) respectively corresponds(correspond) to the Q1 first-type radio resource(s), the first field of the first downlink information is used by the U4 for determining a first identifier, the first radio resource is one of the Q1 first-type radio resource(s), a first-type identifier of the Q1 first-type identifier(s) corresponding to the first radio resource is the first identifier. The Q2 piece(s) of third downlink information is(are) respectively used for determining Q2 second-type radio resource(s) and Q2 second-type identifier(s), the Q2 second-type identifier(s) respectively corresponds(correspond) to the Q2 second-type radio resource(s), the second field of the first downlink information is used by the U4 for determining a second identifier, the second radio resource is one of the Q2 second-type radio resource(s), a second-type identifier of the Q2 second-type identifier(s) corresponding to the second radio resource is the second identifier. The Q1 and the Q2 are positive integers respectively. The downlink signaling is used for triggering a transmission of at least one of the first-type reference signal or the second-type reference signal. The first radio resource comprises M first sub-resource(s), the first-type reference signal is transmitted by M first-type antenna port set(s) respectively in the M first sub-resource(s). The second radio resource comprises K second sub-resource(s), the second-type reference signal is transmitted by K second-type antenna port set(s) respectively in the K second sub-resource(s). Any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively. A measurement on the first-type reference signal is used by the N3 for at least one of triggering the fourth downlink information or generating the fourth downlink information. The fourth downlink information is used by the N3 for reconfiguration of at least the latter of the first radio resource and the second radio resource.

In one embodiment, the first-type reference signal is an SRS, and the second-type reference signal is a CSI-RS.

In one embodiment, the first radio resource comprises an SRS resource.

In one embodiment, the second radio resource comprises a CSI-RS resource.

In one embodiment, the second field is a csi-RS-ConfigNZPId-r11 field.

In one embodiment, the second downlink information is a SoundingRS-UL-Config IE.

In one embodiment, the third downlink information is a CSI-RS-Config IE.

In one embodiment, any given first-type antenna port of the positive integer number of first-type antenna port(s) is formed by superposition of multiple first-type antennas through antenna virtualization, mapping coefficients from the multiple first-type antennas to the any given first-type antenna port constitute a first-type beamforming vector corresponding to the any given first-type antenna port. A first-type beamforming vector is composed by a Kronecker product of a first-type analog beamforming vector and a first-type digital beamforming vector. The multiple first-type antennas are antennas configured by the U4.

In one embodiment, any given second-type antenna port of the positive integer number of second-type antenna port(s) is formed by superposition of multiple second-type antennas through antenna virtualization, mapping coefficients from the multiple second-type antennas to the any given second-type antenna port constitute a second-type beamforming vector corresponding to the any given second-type antenna port. A second-type beamforming vector is composed by a Kronecker product of a second-type analog beamforming vector and a second-type digital beamforming vector. The multiple second-type antennas are antennas configured by the N3.

In one embodiment, the phrase that a measurement on the first-type reference signal is used by the N3 for generating the fourth downlink information means that the measurement on the first-type reference signal is used by the N3 for determining the K, the fourth downlink information indicates the K.

In one embodiment, the phrase that a measurement on the first-type reference signal is used by the N3 for generating the fourth downlink information means that the measurement on the first-type reference signal is used by the N3 for determining the K second-type antenna port set(s), the fourth downlink information indicates the K second-type antenna port set(s).

In one embodiment, the phrase that a measurement on the first-type reference signal is used by the N3 for determining the K second-type antenna port set(s). When the K second-type antenna port set(s) is(are) subjected to change, the transmission of the fourth downlink information is triggered; or when the K second-type antenna port set(s) stays(stay) unchanged, the transmission of the fourth downlink information is not triggered.

In one embodiment, the phrase that a measurement on the first-type reference signal is used by the N3 for determining the K1 reference vector(s). When the K1 reference vector(s) is(are) subjected to change, the transmission of the fourth downlink information is triggered; or when the K1 reference vector(s) stays(stay) unchanged, the transmission of the fourth downlink information is not triggered.

In one subembodiment of the above embodiment, the K1 is a positive integer no greater than the K.

In one subembodiment of the above embodiment, the K1 is used for determining the K.

In one subembodiment of the above embodiment, the K1 reference vector(s) is(are) used for determining the K second-type antenna port set(s).

In one embodiment, boxes F8-F13 in FIG. 2 all exist.

In one embodiment, boxes F8, F9, F11 and F12 in FIG. 2 exist, while boxes F10 and box F13 in FIG. 2 do not exist.

In one embodiment, boxes F8-F12 in FIG. 2 exist, while box F13 in FIG. 2 does not exist.

In one embodiment, boxes F8, F9, F10, F11 and F13 in FIG. 2 exist, while box F12 in FIG. 2 does not exist.

In one embodiment, boxes F8, F9, F11 and F13 in FIG. 2 exist, while box F10 and box F12 in FIG. 2 do not exist.

In one embodiment, boxes F8-13 in FIG. 2 do not exist.

Embodiment 3

Figure 3:
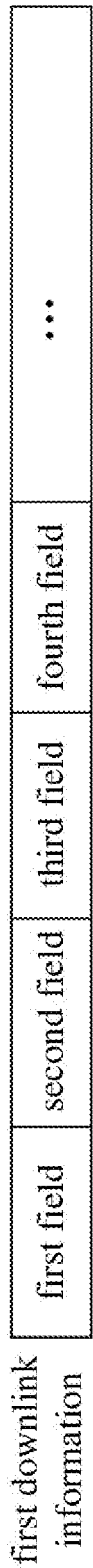
FIG. 3 illustrates a schematic diagram of the content of first downlink information according to one embodiment of the present disclosure.

Embodiment 3 illustrates a schematic diagram of the content of first downlink information, as shown in FIG. 3.

In Embodiment 3, the first downlink information is an IE, the first downlink information comprises a first field, a second field, a third field and a fourth field. The first field of the first downlink information is used for determining a first radio resource, the second field of the first downlink information is used for determining a second radio resource, the third field of the first downlink information is used for determining a third radio resource, and the fourth field of the first downlink information is used for identifying the IE corresponding to the first downlink information. The first radio resource is reserved for the first-type reference signal in the present disclosure, and the second-type reference signal is reserved for the second-type reference signal in the present disclosure. The first information in the present disclosure is transmitted in the third radio resource.

In one embodiment, the IE is a CSI-Process IE.

In one embodiment, the first downlink information is a CSI-Process IE.

In one embodiment, the first downlink information comprises all fields of a CSI-Process IE.

In one embodiment, the first field is a csi-RS-ConfigNZPId-r11 field.

In one embodiment, the second field is a csi-RS-ConfigNZPId-r11 field.

In one embodiment, the fourth field is a csi-ProcessId-r11 field.

In one embodiment, the first downlink information comprises a fifth field, the fifth field of the first downlink information is used for determining a fourth radio resource, the first node in the present disclosure receives a third-type reference signal in the fourth radio resource, a measurement on the first-type reference signal and a measurement on the third-type reference signal are used for determining the first information.

In one subembodiment of the above embodiment, the fourth radio resource comprises one or more of a time domain resource, a frequency domain resource or a code domain resource.

In one subembodiment of the above embodiment, the third-type reference signal comprises one or more of a ZP CSI-RS, an NZP CSI-RS or a DMRS.

In one subembodiment of the above embodiment, the fifth field is a csi-IM-ConfigId-r11 field.

Embodiment 4

Figure 4:
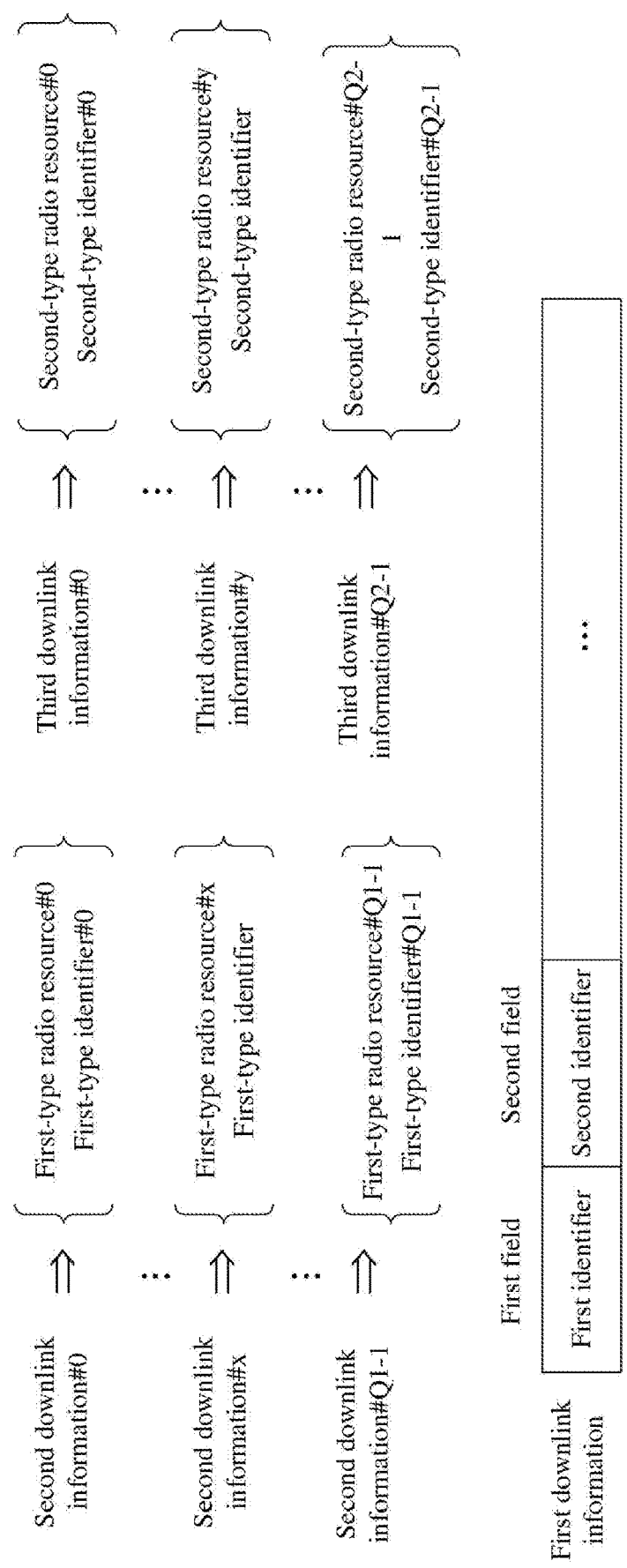
FIG. 4 illustrates a schematic diagram of relations between first downlink information, Q1 piece(s) of second downlink information and Q2 piece(s) of third downlink information according to one embodiment of the present disclosure.

Embodiment 4 illustrates a schematic diagram of relations between first downlink information, Q1 piece(s) of second downlink information and Q2 piece(s) of third downlink information, as shown in FIG. 4.

In Embodiment 4, the first downlink information is an IE, the first downlink information comprises a first field and a second field, the first field of the first downlink information is used for determining a first radio resource, the second field of the first downlink information is used for determining a second radio resource. The Q1 piece(s) of second downlink information are respectively used for determining Q1 first-type radio resource(s) and Q1 first-type identifier(s), the Q1 first-type identifier(s) respectively corresponds(correspond) to the Q1 first-type radio resource(s), the first field of the first downlink information is used for determining a first identifier, the first radio resource is one of the Q1 first-type radio resource(s), a first-type identifier of the Q1 first-type identifier(s) corresponding to the first radio resource is the first identifier. The Q2 piece(s) of third downlink information are respectively used for determining Q2 second-type radio resource(s) and Q2 second-type identifier(s), the Q2 second-type identifier(s) respectively corresponds(correspond) to the Q2 second-type radio resource(s), the second field of the first downlink information is used for determining a second identifier, the second radio resource is one of the Q2 second-type radio resource(s), a second-type identifier of the Q2 second-type identifier(s) corresponding to the second radio resource is the second identifier. The Q1 and the Q2 are positive integers respectively.

In FIG. 4, indices of the Q1 piece(s) of second downlink information, the Q1 first-type radio resource(s) and the Q1 first-type identifier(s) are respectively #0, #1, . . . , and #Q1-1; index(indices) of the Q2 piece(s) of third downlink information, the Q2 second-type radio resource(s) and the Q2 second-type identifier(s) are respectively #0, #1, . . . , and #Q2-1. A value of a first-type identifier #x is equal to the first identifier, the first radio resource is a first-type radio resource #x, wherein x is a non-negative integer less than the Q1. A value of a second-type identifier #y is equal to the second identifier, the second radio resource is a second-type radio resource #y, wherein y is a non-negative integer less than the Q2.

In one embodiment, the second downlink information is an IE.

In one embodiment, the second downlink information is a CSI-RS-Config IE, the first node in the present disclosure is the UE, and the second node in the present disclosure is the base station.

In one embodiment, the second downlink information is a SoundingRS-UL-Config IE, the first node is the base station, and the second node is the UE.

In one embodiment, the third downlink information is an IE.

In one embodiment, the third downlink information is a SoundingRS-UL-Config IE, the first node is the UE, and the second node is the base station.

In one embodiment, the third downlink information is a CSI-RS-Config IE, the first node is the base station, and the second node is the UE.

In one embodiment, the first field of the first downlink information indicates the first identifier.

In one embodiment, the second field of the first downlink information indicates the second identifier.

In one embodiment, the Q1 first-type identifiers are respectively non-negative integers.

In one embodiment, the Q2 second-type identifiers are respectively non-negative integers.

In one embodiment, the first identifier is a non-negative integer.

In one embodiment, the second identifier is a non-negative integer.

Embodiment 5

Figure 5:
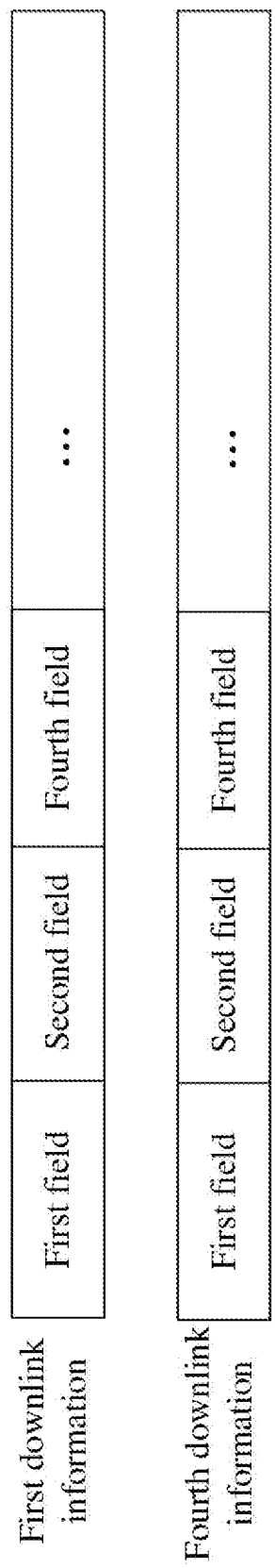
FIG. 5 illustrates a schematic diagram of a relation between first downlink information and fourth downlink information according to one embodiment of the present disclosure.

Embodiment 5 illustrates a schematic diagram of a relation between first downlink information and fourth downlink information, as shown in FIG. 5.

In Embodiment 5, the first downlink information and the fourth downlink information are respectively an IE, and the first downlink information and the fourth downlink information respectively comprise a first field, a second field and a fourth field. The first field of the first downlink information is used for determining a first radio resource, the first field of the fourth downlink information is used for reconfiguration of the first radio resource. The second field of the first downlink information is used for determining a second radio resource, the second field of the fourth downlink information is used for reconfiguration of the second radio resource. The fourth field of the first downlink information is used for identifying the IE corresponding to the first downlink information, the fourth field of the fourth downlink information is used for identifying the IE corresponding to the fourth downlink information. A value of the fourth field of the first downlink information is equal to a value of the fourth field of the fourth downlink information.

In one embodiment, both of the first downlink information and the fourth downlink information are CSI-Process IE.

In one embodiment, the first field is a csi-RS-ConfigNZPId-r11 field.

In one embodiment, the second field is a csi-RS-ConfigNZPId-r11 field.

In one embodiment, the fourth field is a csi-ProcessId-r11 field.

In one embodiment, the first field of the first downlink information is used for determining a first identifier, the first field of the fourth downlink information is used for determining a third identifier, the first identifier and the third identifier are respectively one of the Q1 first-type identifier(s) in the present disclosure.

In one subembodiment of the above embodiment, the first identifier is equal to the third identifier.

In one subembodiment of the above embodiment, the first identifier is unequal to the third identifier.

In one embodiment, the second field of the first downlink information is used for determining a second identifier, the second field of the fourth downlink information is used for determining a fourth identifier, the second identifier and the fourth identifier are respectively one of the Q2 second-type identifier(s) in the present disclosure.

In one subembodiment of the above embodiment, the second identifier is unequal to the fourth identifier.

Embodiment 6

Figure 6:
FIG. 6 illustrates a schematic diagram illustrating how to generate a second-type reference signal based on a measurement on a first-type reference signal according to one embodiment of the present disclosure.

Embodiment 6 illustrates a schematic diagram illustrating how to generate a second-type reference signal based on a measurement on a first-type reference signal, as shown in FIG. 6.

In Embodiment 6, the second node in the present disclosure transmits the first-type reference signal in a first radio resource, the first node in the present disclosure transmits the second-type reference signal in a second radio resource. The first radio resource comprises M first sub-resource(s), the first-type reference signal is transmitted by M first-type antenna port set(s) respectively in the M first sub-resource(s). The second radio resource comprises K second sub-resource(s), the second-type reference signal is transmitted by K second-type antenna port set(s) respectively in the K second sub-resource(s). Any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively. Measurement(s) on K1 first-type sub-signal(s) is(are) respectively used for determining K1 reference vector(s), the K1 reference vector(s) is(are) used for determining the K second-type antenna port set(s). The K1 first-type sub-signal(s) is(are) a subset of the M first-type sub-signal(s), the K1 is a positive integer no greater than M and no greater than K.

In FIG. 6, the blank ellipse with solid curve and the slash-filled ellipse with solid curve altogether represent the first-type reference signal, wherein the slash-filled ellipse with solid curve represents the K1 first-type sub-signal(s); and the grid-filled ellipse with broken line and the dotted ellipse with broken line altogether represent the second-type reference signal.

In one embodiment, measurement(s) on the M first-type sub-signal(s) is(are) respectively used for determining M first measurement value(s), the K1 first-type sub-signal(s) is(are) first-type sub-signal(s) of the M first-type sub-signal(s) corresponding to the greatest K1 first measurement value(s) of the M first measurement value(s).

In one embodiment, measurement(s) on the M first-type sub-signal(s) is(are) respectively used for determining M reference vector(s), the K1 reference vector(s) is(are) a subset of the M reference vector(s). Any of the M reference vector(s) belongs to an antenna virtualization vector set, the antenna virtualization vector set comprises a positive integer number of antenna virtualization vector(s).

In one embodiment, for any given first-type sub-signal of the M first-type sub-signal(s), the received quality of the given first-type sub-signal when received employing a reference vector of the M reference vector(s) corresponding to the given first-type sub-signal is higher than the received quality of the given first-type sub-signal when received employing any other antenna virtualization vector of the antenna virtualization vector set.

In one subembodiment, the received quality is CQI.

In one subembodiment, the received quality is RSRP.

In one subembodiment, the received quality is RSRQ.

In one embodiment, any of the M first measurement value(s) is a received quality acquired after the corresponding first-type sub-signal of the M first-type sub-signal(s) is received with a corresponding reference vector of the M reference vector(s).

In one embodiment, any given first-type antenna port of the positive integer number of first-type antenna port(s) is formed by superposition of multiple first-type antennas through antenna virtualization, mapping coefficients from the multiple first-type antennas to the any given first-type antenna port constitute a first-type beamforming vector corresponding to the any given first-type antenna port. A first-type beamforming vector is composed by a Kronecker product of a first-type analog beamforming vector and a first-type digital beamforming vector. The multiple first-type antennas are antennas configured by the second node.

In one embodiment, different first-type antenna ports in any of the M first-type antenna port set(s) correspond to a same first-type analog beamforming vector.

In one embodiment, different first-type antenna ports in any of the M first-type antenna port set(s) correspond to different first-type digital beamforming vectors.

In one embodiment, different first-type antenna port sets of the M first-type antenna port sets correspond to different first-type analog beamforming vectors.

In one embodiment, any given second-type antenna port of the positive integer number of second-type antenna port(s) is formed by superposition of multiple second-type antennas through antenna virtualization, mapping coefficients from the multiple second-type antennas to the any given second-type antenna port constitute a second-type beamforming vector corresponding to the any given second-type antenna port. A second-type beamforming vector is composed by a Kronecker product of a second-type analog beamforming vector and a second-type digital beamforming vector. The multiple second-type antennas are antennas configured by the first node.

In one embodiment, different second-type antenna ports in any of the K second-type antenna port set(s) correspond to a same second-type analog beamforming vector.

In one embodiment, different second-type antenna ports in any of the K second-type antenna port set(s) correspond to different second-type digital beamforming vectors.

In one embodiment, different second-type antenna port sets of the K second-type antenna port sets correspond to different second-type analog beamforming vectors.

In one embodiment, the K1 reference vector(s) is(are) used for determining K second-type analog beamforming vector(s), the K second-type analog beamforming vector(s)

is(are) respectively second-type analog beamforming vector(s) corresponding to the K second-type antenna port set(s).

In one embodiment, the K1 is less than or equal to the K, K1 second-type analog beamforming vector(s) out of the K second-type analog beamforming vector(s) is(are) respectively equal to the K1 reference vector(s). In FIG. 6, the grid-filled ellipse framed with broken line represents a second-type antenna port set(s) acquired after respectively using the K1 reference vector(s) as second-type analog beamforming vector(s). In FIG. 6, the dotted ellipse framed with broken line represents a second-type antenna port set(s) corresponding to one of the K second-type analog beamforming vector(s) other than the K1 reference vector(s). In FIG. 6, the ellipse with broken line represents a second-type antenna port set acquired after an antenna virtualization vector of the antenna virtualization vector set is used as a second-type analog beamforming vector.

In one subembodiment, any of the K second-type analog beamforming vector(s) is an antenna virtualization vector of the antenna virtualization vector set.

In one embodiment, time domain resources occupied by any two of the M first sub-resources are orthogonal (non-overlapping).

In one embodiment, time domain resources occupied by at least two of the M first sub-resources are orthogonal (non-overlapping).

In one embodiment, at least two of the M first sub-resources occupy a same time domain resource.

In one embodiment, time domain resources occupied by any two of the K second sub-resources are orthogonal (non-overlapping).

In one embodiment, time domain resources occupied by at least two of the K second sub-resources are orthogonal (non-overlapping).

In one embodiment, at least two of the K second sub-resources occupy a same time domain resource.

Embodiment 7

Figure 7:
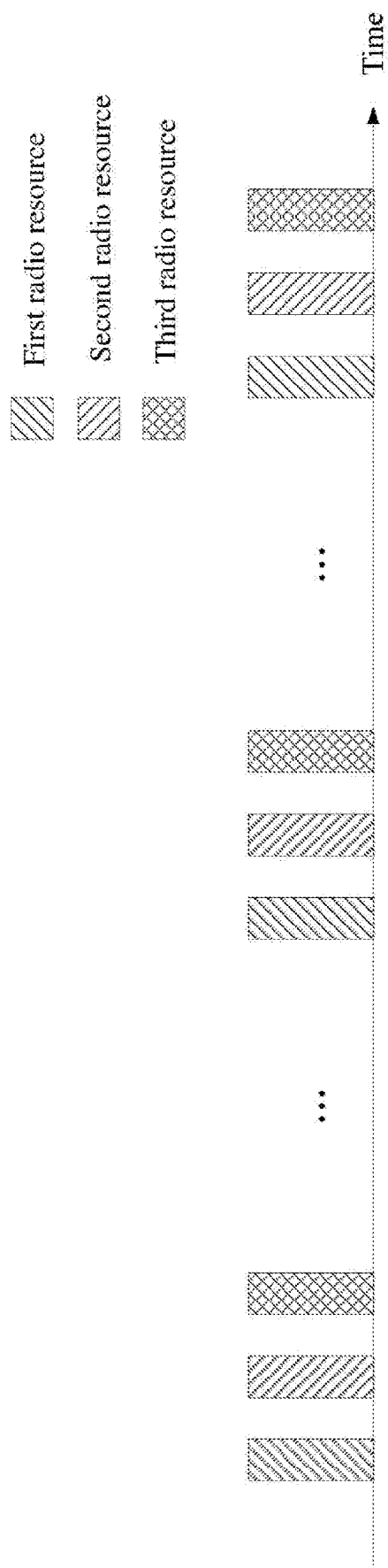
FIG. 7 illustrates a schematic diagram of relations between a first radio resource, a second radio resource and a third radio resource in time domain according to one embodiment of the present disclosure.

Embodiment 7 illustrates a schematic diagram of relations between a first radio resource, a second radio resource and a third radio resource in time domain, as shown in FIG. 7.

In Embodiment 7, the first radio resource, the second radio resource and the third radio resource occur multiple times in time domain, respectively. Any two adjacent occurrences of the first radio resource in time domain is spaced by an equal time interval, any two adjacent occurrences of the second radio resource in time domain is spaced by an equal time interval, any two adjacent occurrences of the third radio resource in time domain is spaced by an equal time interval. The first radio resource, the second radio resource and the third radio resource are configured by the same IE in the present disclosure. And the first radio resource, the second radio resource and the third radio resource configured by the same IE are connected.

In FIG. 7, the box filled with slashes represents the first radio resource, the box filled with back-slashes represents the second radio resource, and the box filled with grids represents the third radio resource.

In one embodiment, a time interval between any two adjacent occurrences of the first radio resource configured by a given IE in time domain is equal to a time interval between any two adjacent occurrences of the second radio resource configured by the given IE in time domain. A time interval between any two adjacent occurrences of the first radio resource configured by a given IE in time domain is equal to a time interval between any two adjacent occurrences of the third radio resource configured by the given IE in time domain. The given IE is any of the IE.

Embodiment 8

Figure 8:
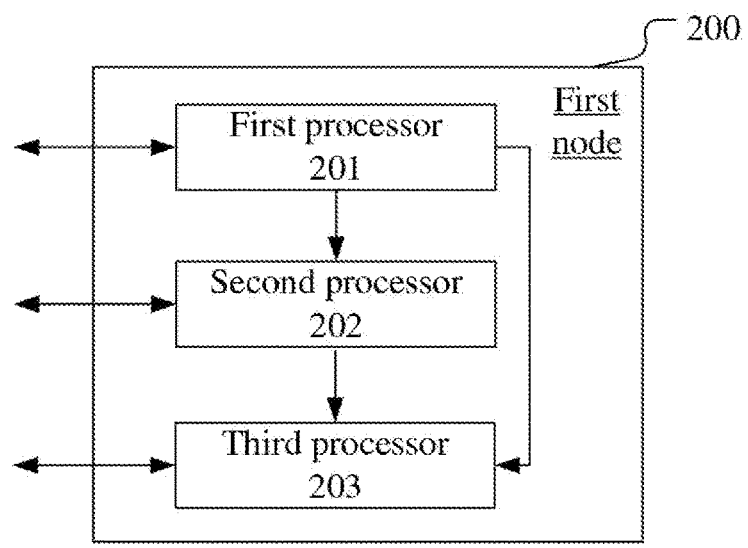
FIG. 8 illustrates a structure block diagram of a processing device in a first node according to one embodiment of the present disclosure.

Embodiment 8 illustrates a structure block diagram of a processing device in a first node, as shown in FIG. 8. In FIG. 8, a processing device 200 in the first node consists of a first processor 201, a second processor 202 and a third processor 203.

In Embodiment 8, the first processor 201 receives first downlink information; the second processor 202 receives a first-type reference signal in a first radio resource; and the third processor 203 transmits a second-type reference signal in a second radio resource.

In Embodiment 8, the first node is a UE. The first downlink information is an IE, the first downlink information comprises a first field and a second field, the first field of the first downlink information is used by the second processor 202 for determining the first radio resource, the second field of the first downlink information is used by the third processor 203 for determining the second radio resource. The first radio resource is reserved for the first-type reference signal, the second radio resource is reserved for the second-type reference signal. A target receiver of the first-type reference signal comprises the first node, a transmitter of the second-type reference signal is the first node. A measurement on the first-type reference signal is used by the third processor 203 for generating the second-type reference signal. The first radio resource comprises M first sub-resource(s), the first-type reference signal is transmitted by M first-type antenna port set(s) respectively in the M first sub-resource(s). The second radio resource comprises K second sub-resource(s), the second-type reference signal is transmitted by K second-type antenna port set(s) respectively in the K second sub-resource(s). Any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively.

In one embodiment, the first processor 201 also receives Q1 piece(s) of second downlink information and Q2 piece(s) of third downlink information. Herein, the Q1 piece(s) of second downlink information is(are) respectively used by the second processor 202 for determining Q1 first-type radio resource(s) and Q1 first-type identifier(s), the Q1 first-type identifier(s) respectively corresponds(correspond) to the Q1 first-type radio resource(s), the first field of the first downlink information is used by the second processor 202 for determining a first identifier, the first radio resource is one of the Q1 first-type radio resource(s), a first-type identifier of the Q1 first-type identifier(s) corresponding to the first radio resource is the first identifier. The Q2 piece(s) of third downlink information is(are) respectively used by the third processor 203 for determining Q2 second-type radio resource(s) and Q2 second-type identifier(s), the Q2 second-type identifier(s) respectively corresponds(correspond) to the Q2 second-type radio resource(s), the second field of the first downlink information is used by the third processor 203 for determining a second identifier, the second radio resource is one of the Q2 second-type radio resource(s), a second-type identifier of the Q2 second-type identifier(s)

corresponding to the second radio resource is the second identifier. The Q1 and the Q2 are positive integers respectively.

In one embodiment, the first processor 201 also receives a downlink signaling. Herein, the downlink signaling is used for triggering a transmission of at least one of the first-type reference signal or the second-type reference signal.

In one embodiment, the first-type reference signal is a CSI-RS, and the second-type reference signal is an SRS.

In one embodiment, the first downlink information comprises a fourth field, the fourth field of the first downlink information is used for identifying the IE corresponding to the first downlink information.

In one embodiment, the second processor 202 also transmits first information. Herein, a measurement on the first-type reference signal is used by the second processor 202 for determining the first information. The first information is used for determining whether the K second-type antenna port set(s) needs(need) updating. The first downlink information comprises a third field, the third field of the first downlink information is used by the second processor 202 for determining a third radio resource, the first information is transmitted in the third radio resource.

In one embodiment, the third processor 203 also receives fourth downlink information. Herein, the first information is used for triggering the fourth downlink information. The fourth downlink information is used for reconfiguration of at least the latter of the first radio resource and the second radio resource.

Embodiment 9

Figure 9:
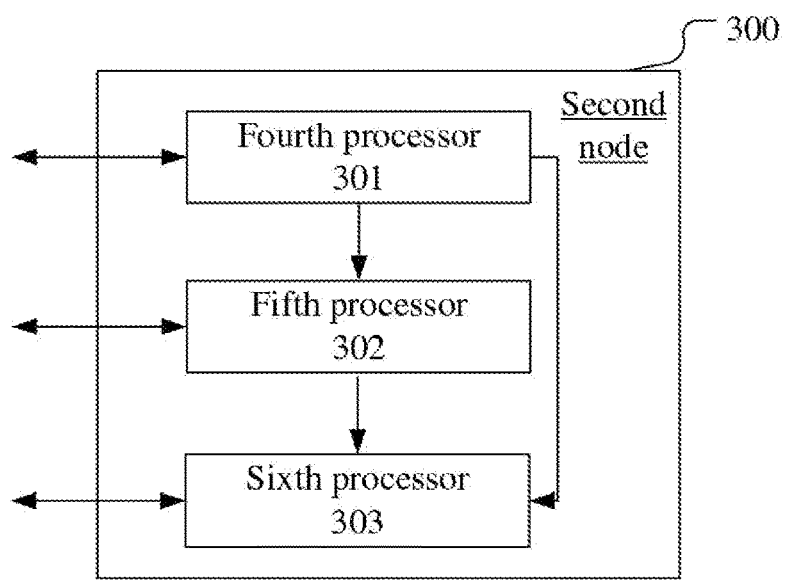
FIG. 9 illustrates a structure block diagram of a processing device in a second node according to one embodiment of the present disclosure.

Embodiment 9 illustrates a structure block diagram of a processing device in a second node, as shown in FIG. 9. In FIG. 9, a processing device 300 in a second node consists of a fourth processor 301, a fifth processor 302 and a sixth processor 303.

In Embodiment 9, the fourth processor 301 transmits first downlink information; the fifth processor 302 transmits a first-type reference signal in a first radio resource; and the sixth processor 303 receives a second-type reference signal in a second radio resource.

In Embodiment 9, the second node is a base station. The first downlink information is an IE, the first downlink information comprises a first field and a second field, the first field of the first downlink information is used for determining a first radio resource, the second field of the first downlink information is used for determining a second radio resource. The first radio resource is reserved for a first-type reference signal, the second radio resource is reserved for a second-type reference signal. A transmitter of the first-type reference signal is the second node, a target receiver of the second-type reference signal comprises the second node. A measurement on the first-type reference signal is used for generating the second-type reference signal. The first radio resource comprises M first sub-resource(s), the first-type reference signal is transmitted by M first-type antenna port set(s) respectively in the M first sub-resource(s). The second radio resource comprises K second sub-resource(s), the second-type reference signal is transmitted by K second-type antenna port set(s) respectively in the K second sub-resource(s). Any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively.

In one embodiment, the fourth processor 301 also transmits Q1 piece(s) of second downlink information and Q2 piece(s) of third downlink information. Herein, the Q1 piece(s) of second downlink information is(are) respectively used for determining Q1 first-type radio resource(s) and Q1 first-type identifier(s), the Q1 first-type identifier(s) respectively corresponds(correspond) to the Q1 first-type radio resource(s), the first field of the first downlink information is used for determining a first identifier, the first radio resource is one of the Q1 first-type radio resource(s), a first-type identifier of the Q1 first-type identifier(s) corresponding to the first radio resource is the first identifier. The Q2 piece(s) of third downlink information is(are) respectively used for determining Q2 second-type radio resource(s) and Q2 second-type identifier(s), the Q2 second-type identifier(s) respectively corresponds(correspond) to the Q2 second-type radio resource(s), the second field of the first downlink information is used for determining a second identifier, the second radio resource is one of the Q2 second-type radio resource(s), a second-type identifier of the Q2 second-type identifier(s) corresponding to the second radio resource is the second identifier. The Q1 and the Q2 are positive integers respectively.

In one embodiment, the fourth processor 301 also transmits a downlink information. Herein, the downlink signaling is used for triggering a transmission of at least one of the first-type reference signal or the second-type reference signal.

In one embodiment, the first-type reference signal is a CSI-RS, and the second-type reference signal is an SRS.

In one embodiment, the first downlink information comprises a fourth field, the fourth field of the first downlink information is used for identifying the IE corresponding to the first downlink information.

In one embodiment, the fifth processor 302 also receives first information. Herein, a measurement on the first-type reference signal is used for determining the first information. The first information is used by the fourth processor 301 for determining whether the K second-type antenna port set(s) needs(need) updating. The first downlink information comprises a third field, the third field of the first downlink information is used for determining a third radio resource, the first information is transmitted in the third radio resource.

In one embodiment, the sixth processor 303 also transmits fourth downlink information. Herein, the first information is used for triggering the fourth downlink information. The fourth downlink information is used for reconfiguration of at least the latter of the first radio resource and the second radio resource.

Embodiment 10

Figure 10:
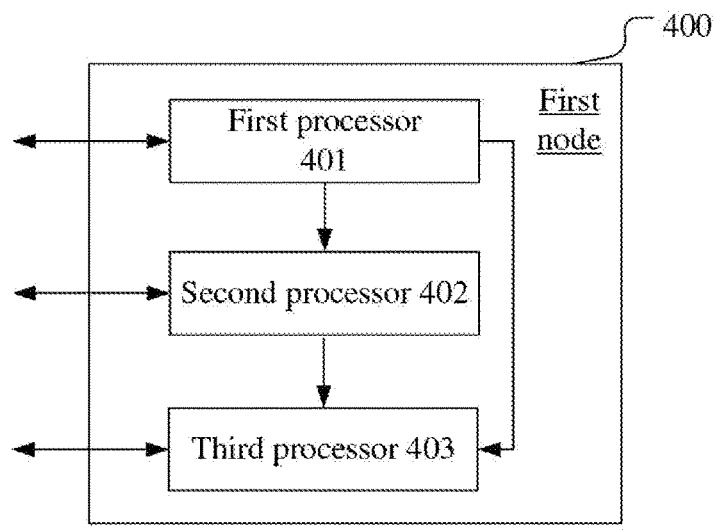
FIG. 10 illustrates a structure block diagram of a processing device in a first node according to another embodiment of the present disclosure.

Embodiment 10 illustrates a structure block diagram of a processing device in a first node, as shown in FIG. 10. In FIG. 10, a processing device 400 in a first node consists of a first processor 401, a second processor 402 and a third processor 403.

In Embodiment 10, the first processor 401 transmits first downlink information; the second processor 402 receives a first-type reference signal in a first radio resource; and the third processor 403 transmits a second-type reference signal in a second radio resource.

In Embodiment 10, the first node is a base station. The first downlink information is an IE, the first downlink information comprises a first field and a second field, the first field of the first downlink information is used for determining a first radio resource, the second field of the first downlink information is used for determining a second radio resource. The first radio resource is reserved for the first-type reference signal, the second radio resource is reserved for a second-type reference signal. A target receiver of the first-type reference signal comprises the first node, a transmitter of the second-type reference signal is the first node. A measurement on the first-type reference signal is used by the third processor 403 for generating the second-type reference signal. The first radio resource comprises M first sub-resource(s), the first-type reference signal is transmitted by M first-type antenna port set(s) respectively in the M first sub-resource(s). The second radio resource comprises K second sub-resource(s), the second-type reference signal is transmitted by K second-type antenna port set(s) respectively in the K second sub-resource(s). Any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively.

In one embodiment, the first processor 401 also transmits Q1 piece(s) of second downlink information and Q2 piece(s) of third downlink information. Herein, the Q1 piece(s) of second downlink information is(are) respectively used for determining Q1 first-type radio resource(s) and Q1 first-type identifier(s), the Q1 first-type identifier(s) respectively corresponds(correspond) to the Q1 first-type radio resource(s), the first field of the first downlink information is used for determining a first identifier, the first radio resource is one of the Q1 first-type radio resource(s), a first-type identifier of the Q1 first-type identifier(s) corresponding to the first radio resource is the first identifier. The Q2 piece(s) of third downlink information is(are) respectively used for determining Q2 second-type radio resource(s) and Q2 second-type identifier(s), the Q2 second-type identifier(s) respectively corresponds(correspond) to the Q2 second-type radio resource(s), the second field of the first downlink information is used for determining a second identifier, the second radio resource is one of the Q2 second-type radio resource(s), a second-type identifier of the Q2 second-type identifier(s) corresponding to the second radio resource is the second identifier. The Q1 and the Q2 are positive integers respectively.

In one embodiment, the first processor 401 also transmits a downlink signaling. Herein, the downlink signaling is used for triggering a transmission of at least one of the first-type reference signal or the second-type reference signal.

In one embodiment, the first-type reference signal is an SRS, and the second-type reference signal is a CSI-RS.

In one embodiment, the third processor 403 also transmits fourth downlink information. Herein, a measurement on the first-type reference signal is used for at least one of triggering the fourth downlink information or generating the fourth downlink information. The fourth downlink information is used for reconfiguration of at least the latter of the first radio resource and the second radio resource.

Embodiment 11

Figure 11:
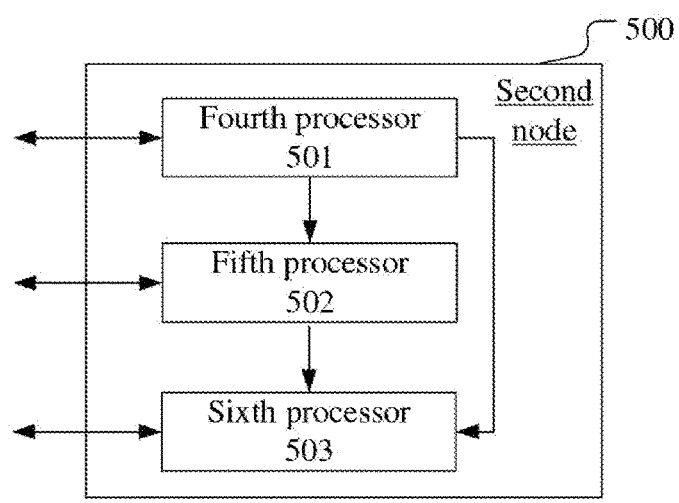
FIG. 11 illustrates a structure block diagram of a processing device in a second node according to another embodiment of the present disclosure.

Embodiment 11 illustrates a structure block diagram of a processing device in a second node, as shown in FIG. 11. In FIG. 11, a processing device 500 in a second node consist of a fourth processor 501, a fifth processor 502 and a sixth processor 503.

In Embodiment 11, the fourth processor 501 receives first downlink information; the fifth processor 502 transmits a first-type reference signal in a first radio resource; the sixth processor 503 receives a second-type reference signal in a second radio resource.

In Embodiment 11, the second node is a UE. The first downlink information is an IE, the first downlink information comprises a first field and a second field, the first field of the first downlink information is used by the fifth processor 502 for determining a first radio resource, the second field of the first downlink information is used by the sixth processor 503 for determining a second radio resource. The first radio resource is reserved for the first-type reference signal, the second radio resource is reserved for the second-type reference signal. A transmitter of the first-type reference signal is the second node, a target receiver of the second-type reference signal comprises the second node. A measurement on the first-type reference signal is used for generating the second-type reference signal. The first radio resource comprises M first sub-resource(s), the first-type reference signal is transmitted by M first-type antenna port set(s) respectively in the M first sub-resource(s). The second radio resource comprises K second sub-resource(s), the second-type reference signal is transmitted by K second-type antenna port set(s) respectively in the K second sub-resource(s). Any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively.

In one embodiment, the fourth processor 501 also receives Q1 piece(s) of second downlink information and Q2 piece(s) of third downlink information. Herein, the Q1 piece(s) of second downlink information is(are) respectively used by the fifth processor 502 for determining Q1 first-type radio resource(s) and Q1 first-type identifier(s), the Q1 first-type identifier(s) respectively corresponds(correspond) to the Q1 first-type radio resource(s), the first field of the first downlink information is used by the fifth processor 502 for determining a first identifier, the first radio resource is one of the Q1 first-type radio resource(s), a first-type identifier of the Q1 first-type identifier(s) corresponding to the first radio resource is the first identifier. The Q2 piece(s) of third downlink information is(are) respectively used by the sixth processor 503 for determining Q2 second-type radio resource(s) and Q2 second-type identifier(s), the Q2 second-type identifier(s) respectively corresponds(correspond) to the Q2 second-type radio resource(s), the second field of the first downlink information is used by the sixth processor 503 for determining a second identifier, the second radio resource is one of the Q2 second-type radio resource(s), a second-type identifier of the Q2 second-type identifier(s) corresponding to the second radio resource is the second identifier. The Q1 and the Q2 are positive integers respectively.

In one embodiment, the fourth processor 501 also receives a downlink signaling. Herein, the downlink information is used for triggering a transmission of at least one of the first-type reference signal or the second-type reference signal.

In one embodiment, the first-type reference signal is an SRS, and the second-type reference signal is a CSI-RS.

In one embodiment, the sixth processor 503 also receives fourth downlink information. Herein, a measurement on the first-type reference signal is used for at least one of triggering the fourth downlink information or generating the fourth downlink information. The fourth downlink information is used for reconfiguration of at least the latter of the first radio resource and the second radio resource.

Embodiment 12

Figure 12:
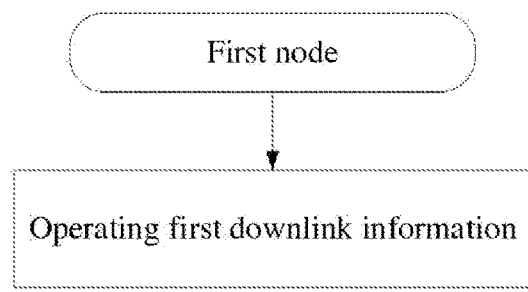
FIG. 12 illustrates a flowchart of first downlink information according to another embodiment of the present disclosure.

Embodiment 12 illustrates a flowchart of first downlink information, as shown in FIG. 12.

In Embodiment 12, the first node in the present disclosure operates first downlink information; herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a target receiver of the first-type reference signal comprises the first node, a transmitter of the second-type reference signal is the first node; a measurement on the first-type reference signal is used for generating the second-type reference signal; the first node is a UE, and the operating is receiving, or the first node is a base station, and the operating is transmitting.

In one embodiment, the first downlink information is carried by a higher-layer signaling.

In one embodiment, the first downlink information is carried by an RRC signaling.

In one embodiment, the IE is a CSI-Process IE.

In one embodiment, the first downlink information is a CSI-Process IE.

In one embodiment, the first downlink information comprises all fields of a CSI-Process IE.

In one embodiment, the first field is a csi-RS-ConfigNZPId-r11 field.

In one embodiment, the second field is a csi-RS-ConfigNZPId-r11 field.

In one embodiment, the first radio resource comprises one or more of a time domain resource, a frequency domain resource or a code domain resource.

In one embodiment, the first radio resource comprises a CSI-RS resource, the first node is a UE.

In one embodiment, the first radio resource comprises an SRS resource, the first node is a base station.

In one embodiment, the second radio resource comprises at least one or more of a time domain resource, a frequency domain resource or a code domain resource.

In one embodiment, the second radio resource comprises an SRS resource, the first node is a UE.

In one embodiment, the second radio resource comprises a CSI-RS resource, the first node is a base station.

In one embodiment, the first-type reference signal comprises a CSI-RS, the first node is a UE.

In one embodiment, the second-type reference signal comprises an SRS, the first node is a UE.

In one embodiment, the first-type reference signal comprises an SRS, the first node is a base station.

In one embodiment, the second-type reference signal comprises a CSI-RS, the first node is a base station.

In one embodiment, the phrase that a measurement on the first-type reference signal is used for generating the second-type reference signal means that In one embodiment, the phrase that a measurement on the first-type reference signal is used for generating the second-type reference signal means that

Embodiment 13

Figure 13:
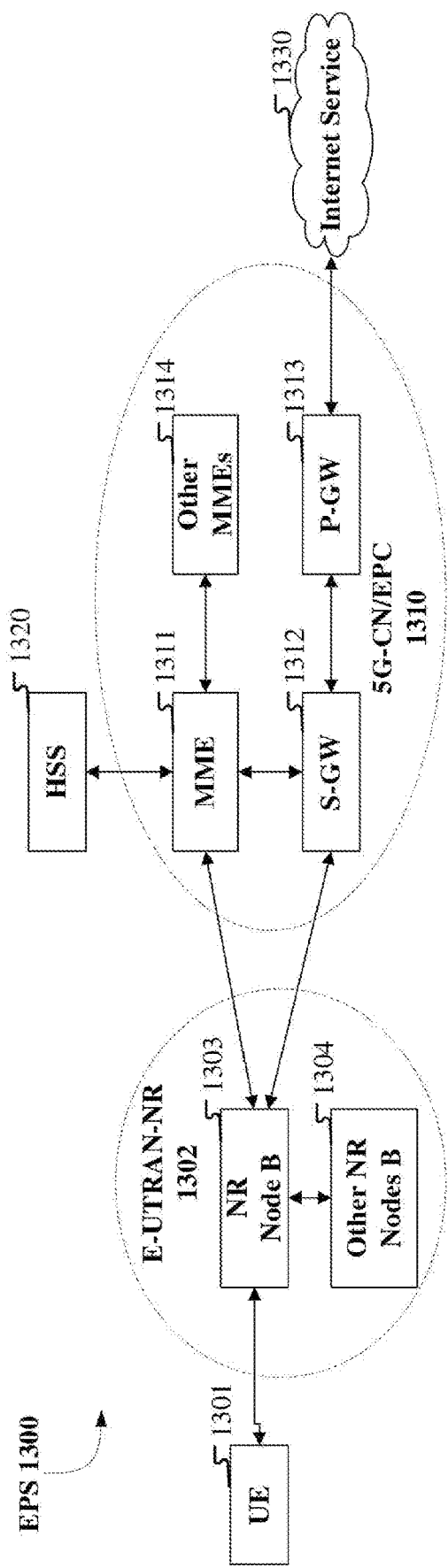
FIG. 13 illustrates a schematic diagram of a network architecture according to another embodiment of the present disclosure.

Embodiment 13 illustrates a schematic diagram of a network architecture, as shown in FIG. 13.

FIG. 13 is a diagram illustrating a network architecture 1300 of Long-Term Evolution (LTE), Long-Term Evolution Advanced (LTE-A) and future 5G systems. The LTE network architecture 1300 may be called an Evolved Packet System (EPS) 1300. The EPS 1300 may comprise one or more UEs 1301, an E-UTRAN-NR 1302, a 5G-Core Network/Evolved Packet Core (5G-CN/EPC) 1310, a Home Subscriber Server (HSS) 1320 and an Internet Service 1330. Herein, UMTS refers to Universal Mobile Telecommunications System. The EPS 1300 may be interconnected with other access networks. For simple description, the entities/interfaces are not shown. As shown in FIG. 13, the EPS 1300 provides packet switching services. Those skilled in the art will find it easy to understand that various concepts presented throughout the present disclosure can be extended to networks providing circuit switching services. The E-UTRAN-NR 1302 comprises an NR node B (gNB) 1303 and other gNBs 1304. The gNB 1303 provides UE 1301 oriented user plane and control plane protocol terminations. The gNB 1303 may be connected to other gNBs 1304 via an X2 interface (for example, backhaul). The gNB 1303 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 1303 provides an access point of the 5G-CN/EPC 1310 for the UE 1301. Examples of UE 1301 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 1301 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 1303 is connected to the 5G-CN/EPC 1310 via an S1 interface. The 5G-CN/EPC 1310 comprises an MME 1311, other MMES 1314, a Service Gateway (S-GW) 1312 and a Packet Date Network Gateway (P-GW) 1313. The MME 1311 is a control node for processing a signaling between the UE 1301 and the 5G-CN/EPC 1310. Generally, the MME 1311 provides bearer and connection management. All user Internet Protocol (IP) packets are transmitted through the S-GW 1312, the S-GW 1312 is connected to the P-GW 1313. The P-GW 1313 provides UE IP address allocation and other functions. The P-GW 1313 is connected to the Internet Service 1330. The Internet Service 1330 comprises IP services corresponding to operators, specifically including Internet, Intranet, IP Multimedia Subsystem (IMS) and Packet Switching Streaming Services (PSSs).

In one embodiment, the UE 1301 corresponds to the first node in the present disclosure, the gNB 1303 corresponds to the second node in the present disclosure.

In one embodiment, the UE 1301 corresponds to the second node in the present disclosure, the gNB 1303 corresponds to the first node in the present disclosure.

Embodiment 14

Figure 14:
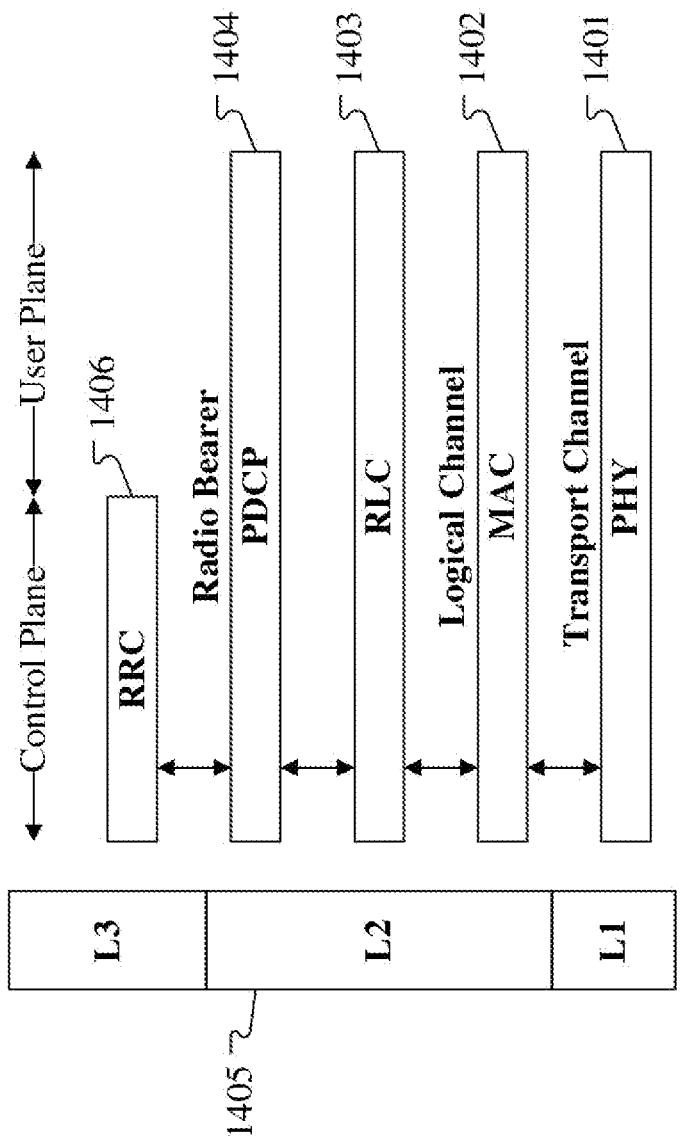
FIG. 14 illustrates a schematic diagram of a radio protocol architecture of a user plane and a control plane according to one embodiment of the present disclosure.

Embodiment 14 illustrates a schematic diagram of a radio protocol architecture of a user plane and a control plane, as shown in FIG. 14.

FIG. 14 is a schematic diagram illustrating a radio protocol architecture of a user plane and a control plane. In FIG. 14, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 1405 is above the PHY 1401, and is in charge of the link between the UE and the gNB via the PHY 1401. In the user plane, L2 1405 comprises a Medium Access Control (MAC) sublayer 1402, a Radio Link Control (RLC) sublayer 1403 and a Packet Data Convergence Protocol (PDCP) sublayer 1404. All the three sublayers terminate at the gNBs of the network side. Although not described in FIG. 14, the UE may comprise several protocol layers above the L2 1405, such as a network layer (i.e., IP layer) terminated at a P-GW 1313 of the network side and an application layer terminated at the other side of the connection (i.e., a peer UE, a server, etc.). The PDCP sublayer 1404 provides multiplexing among variable radio bearers and logical channels. The PDCP sublayer 1404 also provides a header compression for a higher-layer packet so as to reduce a radio transmission overhead. The PDCP sublayer 1404 provides security by encrypting a packet and provides support for UE handover between gNBs. The RLC sublayer 1403 provides segmentation and reassembling of a higher-layer packet, retransmission of a lost packet, and reordering of a packet so as to compensate the disordered receiving caused by Hybrid Automatic Repeat reQuest (HARQ). The MAC sublayer 1402 provides multiplexing between a logical channel and a transport channel. The MAC sublayer 1402 is also responsible for allocating between UEs various radio resources (i.e., resources block) in a cell. The MAC sublayer 1402 is also in charge of HARQ operation. In the control plane, the radio protocol architecture of the UE and the gNB is almost the same as the radio protocol architecture in the user plane on the PHY 1401 and the L2 1405, but there is no header compression for the control plane. The control plane also comprises a Radio Resource Control (RRC) sublayer 1406 in the layer 3 (L3). The RRC sublayer 1406 is responsible for acquiring radio resources (i.e., radio bearer) and configuring the lower layer using an RRC signaling between the gNB and the UE.

In one embodiment, the radio protocol architecture in FIG. 14 is applicable to the first node in the present disclosure.

In one embodiment, the radio protocol architecture in FIG. 14 is applicable to the second node in the present disclosure.

In one embodiment, the first downlink information in the present disclosure is generated by the RRC sublayer 1406.

In one embodiment, the Q1 piece(s) of second downlink information in the present disclosure is(are) generated by the RRC sublayer 1406.

In one embodiment, the Q2 piece(s) of third downlink information in the present disclosure is(are) generated by the RRC sublayer 1406.

In one embodiment, the downlink signaling in the present disclosure is generated by the PHY 1401.

In one embodiment, the downlink signaling in the present disclosure is generated by the MAC sublayer 1402.

In one embodiment, the first-type reference signal in the present disclosure is generated by the PHY 1401.

In one embodiment, the second-type reference signal in the present disclosure is generated by the PHY 1401.

In one embodiment, the first information in the present disclosure is generated by the PHY 1401.

In one embodiment, the fourth downlink information in the present disclosure is generated by the RRC sublayer 1406.

Embodiment 15

Figure 15:
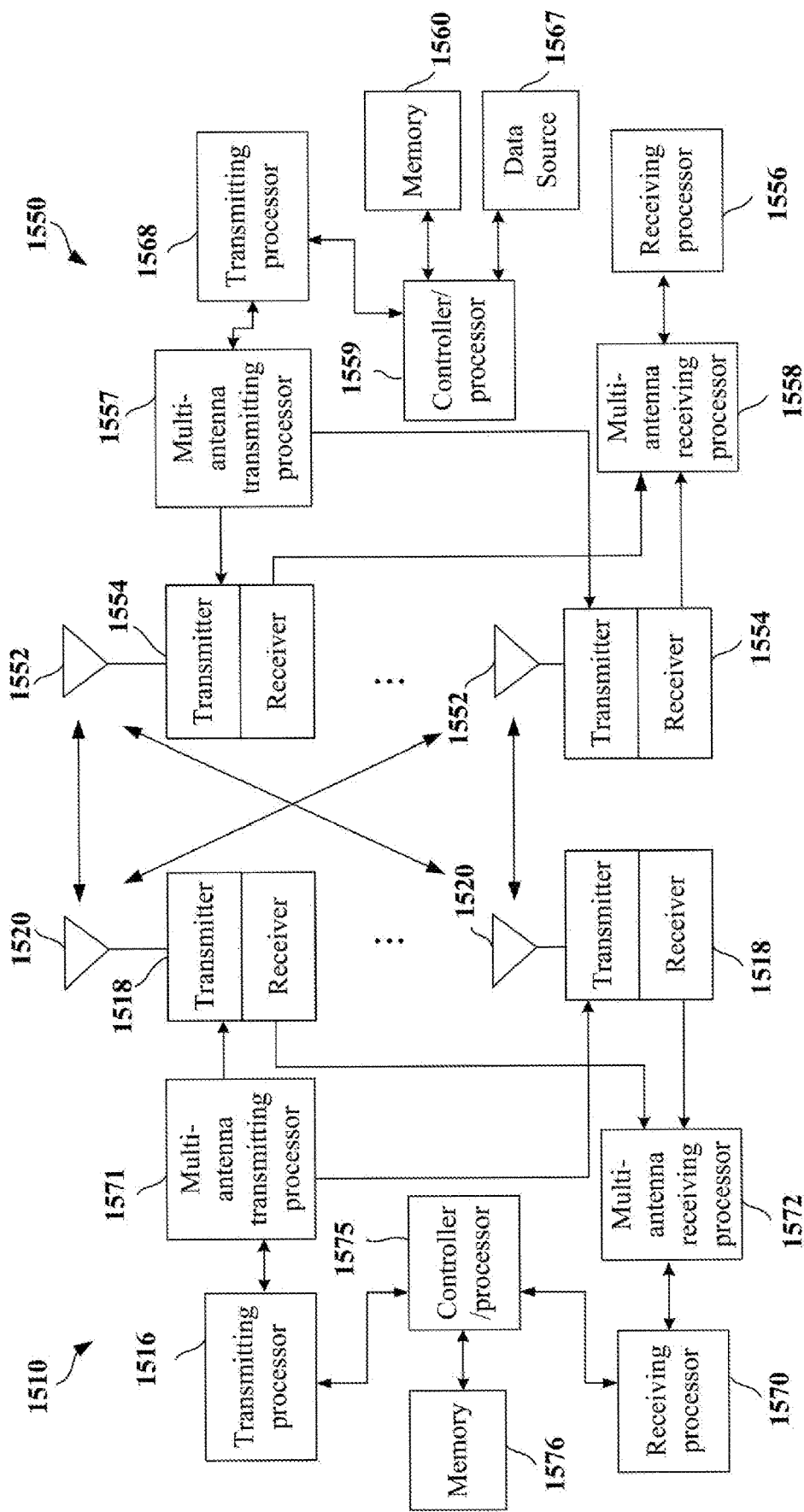
FIG. 15 illustrates a schematic diagram of a New Radio (NR) node and a UE according to one embodiment of the present disclosure.

Embodiment 15 illustrates a schematic diagram of a New Radio (NR) node and a UE, as shown in FIG. 15. In FIG. 15 is a block diagram illustrating a UE 1550 and a gNB 1510 in communication with each other in an access network.

The gNB 1510 comprises a controller/processor 1575, a memory 1576, a receiving processor 1570, a transmitting processor 1516, a multi-antenna receiving processor 1572, a multi-antenna transmitting processor 1571, a transmitter/receiver 1518 and an antenna 1520.

The UE 1550 comprises a controller/processor 1559, a memory 1560, a data source 1567, a transmitting processor 1568, a receiving processor 1556, a multi-antenna transmitting processor 1557, a multi-antenna receiving processor 1558, a transmitter/receiver 1554 and an antenna 1552.

In Downlink (DL) transmission, at the gNB 1510, a higher-layer packet from a core network is provided to a controller/processor 1575. The controller/processor 1575 implements the functionality of the L2. In DL, the controller/processor 1575 provides header compression, encryption, packet segmentation and reordering, and multiplexing between a logical channel and a transport channel, and radio resource allocation for the UE 1550 based on various priorities. The controller/processor 1575 is also in charge of HARQ operation, retransmission of a lost packet, and a signaling to the UE 1550. The transmitting processor 1516 and the multi-antenna transmitting processor 1571 perform signal processing functions used for the L1 layer (that is, PHY). The transmitting processor 1516 performs coding and interleaving so as to ensure a Forward Error Correction (FEC) at the UE 1550 side and implements the mapping to signal clusters corresponding to each modulation scheme (i.e., BPSK, QPSK, M-PSK, M-QAM, etc.). The multi-antenna transmitting processor 1571 performs digital spatial precoding/beamforming on encoded and modulated symbols to generate one or more spatial streams. The transmitting processor 1516 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 1571 performs transmission analog precoding/beamforming operation on the time-domain multi-carrier symbol streams. Each transmitter 1518 converts a baseband multicarrier symbol stream provided by the multi-antenna transmitting processor 1571 into a radio frequency (RF) stream, which is later provided to different antennas 1520.

In DL, at the UE 1550, each receiver 1554 receives a signal via a corresponding antenna 1552. Each receiver 1554 recovers information modulated to the RF carrier, converts the radio frequency stream into a baseband multicarrier symbol stream to be provided to the receiving processor 1556. The receiving processor 1556 and the multi-antenna receiving processor 1558 perform signal processing functions of the L1 layer. The multi-antenna receiving processor 1558 perform reception analog precoding/beamforming operation on the baseband multicarrier symbol stream provided by the receiver 1554. The receiving processor 1556 converts the baseband multicarrier symbol stream from time domain into frequency domain using FFT. In frequency domain, a physical layer data signal and a reference signal are de-multiplexed by the receiving processor 1556, wherein the reference signal is used for channel estimation, while the physical layer data signal is subjected to multi-antenna detection in the multi-antenna receiving processor 1558 to recover any UE 1550-targeted spatial stream. Symbols on each spatial stream are demodulated and recovered in the receiving processor 1556 to generate a soft decision. Then the receiving processor 1556 decodes and de-interleaves the soft decision to recover the higher-layer data and control signal transmitted on the physical channel by the gNB 1510. Next, the higher-layer data and control signal are provided to the controller/processor 1559. The controller/processor 1559 performs functions of the L2 layer. The controller/processor 1559 can be connected to a memory 1560 that stores program code and data. The memory 1560 can be called a computer readable medium. In DL, the controller/processor 1559 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 1559 also performs error detection using ACK and/or NACK protocols as a way to support HARQ operation.

In uplink (UL) transmission, at the UE 1550, the data source 1567 is configured to provide a higher-layer packet to the controller/processor 1559. The data source 1567 represents all protocol layers above the L2 layer. Similar to a transmitting function of the gNB 1510 described in DL transmission, the controller/processor 1559 performs header compression, encryption, packet segmentation and reordering, and multiplexing between a logical channel and a transport channel based on radio resource allocation of the gNB 1510 so as to provide the L2 layer functions used for the user plane and the control plane. The controller/processor 1559 is also responsible for HARQ operation, retransmission of a lost packet, and a signaling to the gNB 1510. The transmitting processor 1568 performs modulation mapping and channel coding, and the multi-antenna transmitting processor 1557 performs digital multi-antenna spatial precoding/beamforming. The generated spatial streams are modulated into multicarrier/single-carrier symbol streams by the transmitting processor 1568, and then modulated symbol streams are subjected to analog precoding/beamforming in the multi-antenna transmitting processor 1557 and are provided from the transmitters 1554 to each antenna 1552. Each transmitter 1554 first converts a baseband symbol stream provided by the multi-antenna transmitting processor 1557 into a radio frequency symbol stream, and then provides the radio frequency symbol stream to the antenna 1552.

In uplink (UL) transmission, the function of the gNB 1510 is similar to the receiving function of the UE 1550 described in DL transmission. Each receiver 1518 receives a radio frequency signal via a corresponding antenna 1520, converts the received radio frequency signal into a baseband signal, and provides the baseband signal to the multi-antenna receiving processor 1572 and the receiving processor 1570. The receiving processor 1570 and the multi-antenna receiving processor 1572 jointly provide functions of the L1 layer. The controller/processor 1575 provides functions of the L2 layer. The controller/processor 1575 can be connected with the memory 1576 that stores program code and data. The memory 1576 can be called a computer readable medium. In UL transmission, the controller/processor 1575 provides de-multiplexing between a transport channel and a logical channel, packet reassembling, decryption, header decompression, control signal processing so as to recover a higher-layer packet from the UE 1550. The higher-layer packet coming from the controller/processor 1375 may be provided to the core network. The controller/processor 1575 can also perform error detection using ACK and/or NACK protocols to support HARQ operation.

In one embodiment, the UE 1550 comprises at least one processor and at least one memory. The at least one memory includes computer program codes. The at least one memory and the computer program codes are configured to be used in collaboration with the at least one processor. The UE 1550 at least receives the first downlink information in the present disclosure. Herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a target receiver of the first-type reference signal comprises the UE 1550, a transmitter of the second-type reference signal is the UE 1550; a measurement on the first-type reference signal is used for generating the second-type reference signal.

In one embodiment, the UE 1550 comprises a memory that stores a computer readable instruction program. The computer readable instruction program generates an action when executed by at least one processor. The action includes: receiving the first downlink information in the present disclosure; herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a target receiver of the first-type reference signal comprises the UE 1550, a transmitter of the second-type reference signal is the UE 1550; a measurement on the first-type reference signal is used for generating the second-type reference signal.

In one embodiment, the gNB 1510 comprises at least one processor and at least one memory. The at least one memory includes computer program codes. The at least one memory and the computer program codes are configured to be used in collaboration with the at least one processor. The gNB 1510 at least transmits first information. Herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a transmitter of the first-type reference signal is the gNB 1510, a target receiver of the second-type reference signal comprises the gNB 1510; a measurement on the first-type reference signal is used for generating the second-type reference signal.

In one embodiment, the gNB 1510 comprises a memory that stores a computer readable instruction program. The computer readable instruction program generates an action when executed by at least one processor. The action includes: transmitting first downlink information. Herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a transmitter of the first-type reference signal is the gNB 1510, a target receiver of the second-type reference signal comprises the gNB 1510; a measurement on the first-type reference signal is used for generating the second-type reference signal.

In one embodiment, the UE 1550 comprises at least one processor and at least one memory. The at least one memory includes computer program codes. The at least one memory and the computer program codes are configured to be used in collaboration with the at least one processor. The UE 1550 at least receives first downlink information. Herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a transmitter of the first-type reference signal is the UE 1550, a target receiver of the second-type reference signal comprises the UE 1550; a measurement on the first-type reference signal is used for generating the second-type reference signal.

In one embodiment, the UE 1550 comprises a memory that stores a computer readable instruction program. The computer readable instruction program generates an action when executed by at least one processor. The action includes: receiving first downlink information. Herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a transmitter of the first-type reference signal is the UE 1550, a target receiver of the second-type reference signal comprises the UE 1550; a measurement on the first-type reference signal is used for generating the second-type reference signal.

In one embodiment, the gNB 1510 comprises at least one processor and at least one memory. The at least one memory includes computer program codes. The at least one memory and the computer program codes are configured to be used in collaboration with the at least one processor. The gNB 1510 at least transmits first downlink information. Herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a target receiver of the first-type reference signal comprises the gNB 1510, a transmitter of the second-type reference signal is the gNB 1510; a measurement on the first-type reference signal is used for generating the second-type reference signal.

In one embodiment, the gNB 1510 comprises a memory that stores a computer readable instruction program. The computer readable instruction program generates an action when executed by at least one processor. The action includes: transmitting first downlink information. Herein, the first downlink information is an IE, the first downlink information comprises a first field and a second field, the first field of the first downlink information is used for determining a first radio resource, the second field of the first downlink information is used for determining a second radio resource; the first radio resource is reserved for a first-type reference signal, the second radio resource is reserved for a second-type reference signal; a target receiver of the first-type reference signal comprises the gNB 1510, a transmitter of the second-type reference signal is the gNB 1510; a measurement on the first-type reference signal is used for generating the second-type reference signal.

In one embodiment, the UE 1550 corresponds to the first node in the present disclosure, the gNB 1510 corresponds to the second node in the present disclosure.

In one embodiment, the UE 1550 corresponds to the second node in the present disclosure, the gNB 1510 corresponds to the first node in the present disclosure.

In one embodiment, at least one of the antenna 1552, the receiver 1554, the receiving processor 1556, the multi-antenna receiving processor 1558, the controller/processor 1559, the memory 1560, or the data source 1567 is used for receiving the first downlink information in the present disclosure; at least one of the antenna 1520, the transmitter 1518, the transmitting processor 1516, the multi-antenna transmitting processor 1571, the controller/processor 1575 or the memory 1576 is used for transmitting the first downlink information in the present disclosure.

In one embodiment, at least one of the antenna 1552, the receiver 1554, the receiving processor 1556, the multi-antenna receiving processor 1558, the controller/processor 1559, the memory 1560 or the data source 1567 is used for receiving the Q1 piece(s) of second downlink information in the present disclosure; at least one of the antenna 1520, the transmitter 1518, the transmitting processor 1516, the multi-antenna transmitting processor 1571, the controller/processor 1575 or the memory 1576 is used for transmitting the Q1 piece(s) of second downlink information in the present disclosure.

In one embodiment, at least one of the antenna 1552, the receiver 1554, the receiving processor 1556, the multi-antenna receiving processor 1558, the controller/processor 1559, the memory 1560 or the data source 1567 is used for receiving the Q2 piece(s) of third downlink information in the present disclosure; at least one of the antenna 1520, the transmitter 1518, the transmitting processor 1516, the multi-antenna transmitting processor 1571, the controller/processor 1575 or the memory 1576 is used for transmitting the Q2 piece(s) of third downlink information in the present disclosure.

In one embodiment, at least one of the antenna 1552, the receiver 1554, the receiving processor 1556, the multi-antenna receiving processor 1558, the controller/processor 1559, the memory 1560 or the data source 1567 is used for receiving the downlink signaling in the present disclosure; at least one of the antenna 1520, the transmitter 1518, the transmitting processor 1516, the multi-antenna transmitting processor 1571, the controller/processor 1575 or the memory 1576 is used for transmitting the downlink signaling in the present disclosure.

In one embodiment, at least one of the antenna 1552, the receiver 1554, the receiving processor 1556, the multi-antenna receiving processor 1558, the controller/processor 1559, the memory 1560 or the data source 1567 is used for receiving the first-type reference signal in the present disclosure; at least one of the antenna 1520, the transmitter 1518, the transmitting processor 1516, the multi-antenna transmitting processor 1571, the controller/processor 1575 or the memory 1576 is used for transmitting the first-type reference signal in the present disclosure.

In one embodiment, at least one of the antenna 1520, the receiver 1518, the receiving processor 1570, the multi-antenna receiving processor 1572, the controller/processor 1575 or the memory 1576 is used for receiving the first-type reference signal in the present disclosure; at least one of the antenna 1552, the transmitter 1554, the transmitting processor 1568, the multi-antenna transmitting processor 1557, the controller/processor 1559, the memory 1560 or the data source 1567 is used for transmitting the first-type reference signal in the present disclosure.

In one embodiment, at least one of the antenna 1520, the receiver 1518, the receiving processor 1570, the multi-antenna receiving processor 1572, the controller/processor 1575 or the memory 1576 is used for receiving the second-type reference signal in the present disclosure; at least one of the antenna 1552, the transmitter 1554, the transmitting processor 1568, the multi-antenna transmitting processor 1557, the controller/processor 1559, the memory 1560 or the data source 1567 is used for transmitting the second-type reference signal in the present disclosure.

In one embodiment, at least one of the antenna 1552, the receiver 1554, the receiving processor 1556, the multi-antenna receiving processor 1558, the controller/processor 1559, the memory 1560 or the data source 1567 is used for receiving the second-type reference signal; at least one of the antenna 1520, the transmitter 1518, the transmitting processor 1516, the multi-antenna transmitting processor 1571, the controller/processor 1575 or the memory 1576 is used for transmitting the second-type reference signal in the present disclosure.

In one embodiment, at least one of the antenna 1520, the receiver 1518, the receiving processor 1570, the multi-antenna receiving processor 1572, the controller/processor 1575 or the memory 1576 is used for receiving the first information in the present disclosure; at least one of the antenna 1552, the transmitter 1554, the transmitting processor 1568, the multi-antenna transmitting processor 1557, the controller/processor 1559, the memory 1560 or the data source 1567 is used for transmitting the first information in the present disclosure.

In one embodiment, at least one of the antenna 1552, the receiver 1554, the receiving processor 1556, the multi-antenna receiving processor 1558, the controller/processor 1559, the memory 1560 or the data source 1567 is used for receiving the fourth downlink information in the present disclosure; at least one of the antenna 1520, the transmitter 1518, the transmitting processor 1516, the multi-antenna transmitting processor 1571, the controller/processor 1575 or the memory 1576 is used for transmitting the fourth downlink information in the present disclosure.

In one embodiment, the first processor 201 in Embodiment 8 comprises at least one of the antenna 1552, the receiver 1554, the receiving processor 1556, the multi-antenna receiving processor 1558, the controller/processor 1559, the memory 1560 or the data source 1567.

In one embodiment, the second processor 202 in Embodiment 8 comprises at least one of the antenna 1552, the transmitter/receiver 1554, the transmitting processor 1568, the receiving processor 1556, the multi-antenna transmitting processor 1557, the multi-antenna receiving processor 1558, the controller/processor 1559, the memory 1560 or the data source 1567.

In one embodiment, the third processor 203 in Embodiment 8 comprises at least one of the antenna 1552, the transmitter/receiver 1554, the transmitting processor 1568, the receiving processor 1556, the multi-antenna transmitting processor 1557, the multi-antenna receiving processor 1558, the controller/processor 1559, the memory 1560 or the data source 1567.

In one embodiment, the fourth processor 301 in Embodiment 9 comprises at least one of the antenna 1520, the transmitter 1518, the transmitting processor 1516, the multi-antenna transmitting processor 1571, the controller/processor 1575 or the memory 1576.

In one embodiment, the fifth processor 302 in Embodiment 9 comprises at least one of the antenna 1520, the transmitter/receiver 1518, the transmitting processor 1516, the receiving processor 1570, the multi-antenna transmitting processor 1571, the multi-antenna receiving processor 1572, the controller/processor 1575 or the memory 1576.

In one embodiment, the sixth processor 303 in Embodiment 9 comprises at least one of the antenna 1520, the transmitter/receiver 1518, the transmitting processor 1516, the receiving processor 1570, the multi-antenna transmitting processor 1571, the multi-antenna receiving processor 1572, the controller/processor 1575 or the memory 1576.

In one embodiment, the first processor 401 in Embodiment 10 comprises at least one of the antenna 1520, the transmitter 1518, the transmitting processor 1516, the multi-antenna transmitting processor 1571, the controller/processor 1575 or the memory 1576.

In one embodiment, the second processor 402 in Embodiment 10 comprises at least one of the antenna 1520, the receiver 1518, the receiving processor 1570, the multi-antenna receiving processor 1572, the controller/processor 1575 or the memory 1576.

In one embodiment, the third processor 403 in Embodiment 10 comprises at least one of the antenna 1520, the transmitter 1518, the transmitting processor 1516, the multi-antenna transmitting processor 1571, the controller/processor 1575 or the memory 1576.

In one embodiment, the fourth processor 501 in Embodiment 11 comprises at least one of the antenna 1552, the receiver 1554, the receiving processor 1556, the multi-antenna receiving processor 1558, the controller/processor 1559, the memory 1560 or the data source 1567.

In one embodiment, the fifth processor 502 in Embodiment 11 comprises at least one of the antenna 1552, the transmitter 1554, the transmitting processor 1568, the multi-antenna transmitting processor 1557, the controller/processor 1559, the memory 1560 or the data source 1567.

In one embodiment, the sixth processor 503 in Embodiment 11 comprises at least one of the antenna 1552, the receiver 1554, the receiving processor 1556, the multi-antenna receiving processor 1558, the controller/processor 1559, the memory 1560 or the data source 1567.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, tele-controlled aircrafts, aircrafts, diminutive airplanes, mobile phones, tablet computers, notebooks, wireless sensor, network cards, terminals for Internet of Things (IOT), RFID terminals, IOT communication modules, vehicle-mounted communication equipment, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, microcellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node used for multi-antenna transmission, comprising:
   receiving Q1 pieces of second downlink information and Q2 pieces of third downlink information, wherein the Q1 pieces of second downlink information are respectively used for determining Q1 first-type radio resources and Q1 first-type identifiers, the Q1 first-type identifiers respectively correspond to the Q1 first-type radio resources, the Q2 pieces of third downlink information are respectively used for determining Q2 second-type radio resources and Q2 second-type identifiers, the Q2 second-type identifiers respectively correspond to the Q2 second-type radio resources, Q1 and Q2 are positive integers greater than 1, respectively; and
   receiving first downlink information;
   wherein the first downlink information is an information element, the first downlink information comprises a first field and a second field, the first field of the first downlink information indicates a first identifier of the Q1 first-type identifiers, the first identifier corresponds to a first radio resource in the Q1 first-type radio resources, the second field of the first downlink information indicates a second identifier of the Q2 second-type identifiers, the second identifier corresponds to a second radio resource in the Q2 second-type radio resources; the first radio resource is reserved for a first-type reference signal, the second radio resource is reserved for a second-type reference signal; a target receiver of the first-type reference signal comprises the first node, a transmitter of the second-type reference signal is the first node; a measurement on the first-type reference signal is used for generating the second-type reference signal; the first node is a User Equipment (UE).

2. The method according to claim 1, wherein:
   the second downlink information is carried by a Radio Resource Control (RRC) signaling and the third downlink information is carried by an RRC signaling.

3. The method according to claim 1, comprising:
   receiving a downlink signaling,
   wherein the downlink signaling is used for triggering a transmission of the second-type reference signal;

or comprising:
   receiving a downlink signaling,
   wherein the downlink signaling is used for triggering a transmission of the second-type reference signal, the downlink signaling is a physical layer signaling.

4. The method according to claim 1, comprising:
   receiving the first-type reference signal in the first radio resource, and
   transmitting the second-type reference signal in the second radio resource,
   wherein the first radio resource comprises M first sub-resource(s), the first-type reference signal is transmitted by M first-type antenna port set(s) respectively in the M first sub-resource(s), the second radio resource comprises K second sub-resource(s), the second-type reference signal is transmitted by K second-type antenna port set(s) respectively in the K second sub-resource(s), any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively;
or comprising:
   receiving the first-type reference signal in the first radio resource, and
   transmitting the second-type reference signal in the second radio resource,
   wherein the first radio resource comprises M first sub-resource(s), the first-type reference signal is transmitted by M first-type antenna port set(s) respectively in the M first sub-resource(s), the second radio resource comprises K second sub-resource(s), the second-type reference signal is transmitted by K second-type antenna port set(s) respectively in the K second sub-resource(s), any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively, the measurement on the first-type reference signal is used for determining the K second-type antenna port set(s).

5. The method according to claim 1, wherein the first-type reference signal is a Channel Status Information (CSI) reference signal, the second-type reference signal is a sounding reference signal;
   or, the first downlink information comprises a fourth field, the fourth field of the first downlink information is used for identifying an information element corresponding to the first downlink information.

6. A method in a second node used for multi-antenna transmission, comprising:
   transmitting Q1 pieces of second downlink information and Q2 pieces of third downlink information, wherein the Q1 pieces of second downlink information are respectively used for determining Q1 first-type radio resources and Q1 first-type identifiers, the Q1 first-type identifiers respectively correspond to the Q1 first-type radio resources, the Q2 pieces of third downlink information are respectively used for determining Q2 second-type radio resources and Q2 second-type identifiers, the Q2 second-type identifiers respectively correspond to the Q2 second-type radio resources, Q1 and Q2 are positive integers greater than 1, respectively; and transmitting first downlink information;

wherein the first downlink information is an information element, the first downlink information comprises a first field and a second field, the first field of the first downlink information indicates a first identifier of the Q1 first-type identifiers, the first identifier corresponds to a first radio resource in the Q1 first-type radio resources, the second field of the first downlink information indicates a second identifier of the Q2 second-type identifiers, the second identifier corresponds to a second radio resource in the Q2 second-type radio resources; the first radio resource is reserved for a first-type reference signal, the second radio resource is reserved for a second-type reference signal; a transmitter of the first-type reference signal is the second node, a target receiver of the second-type reference signal comprises the second node; a measurement on the first-type reference signal is used for generating the second-type reference signal; the second node is a base station.

7. The method according to claim 6, wherein:

the second downlink information is carried by a Radio Resource Control (RRC) signaling and the third downlink information is carried by an RRC signaling.

8. The method according to claim 6, comprising:

transmitting a downlink signaling, wherein the downlink signaling is used for triggering a transmission of the second-type reference signal;

or comprising:

transmitting a downlink signaling, wherein the downlink signaling is used for triggering a transmission of the second-type reference signal, the downlink signaling is a physical layer signaling.

9. The method according to claim 6, comprising:

transmitting the first-type reference signal in the first radio resource, and receiving the second-type reference signal in the second radio resource, wherein the first radio resource comprises M first sub-resource(s), the first-type reference signal is transmitted by M first-type antenna port set(s) respectively in the M first sub-resource(s), the second radio resource comprises K second sub-resource(s), the second-type reference signal is transmitted by K second-type antenna port set(s) respectively in the K second sub-resource(s), any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively;

or comprising:

transmitting the first-type reference signal in the first radio resource, and receiving the second-type reference signal in the second radio resource, wherein the first radio resource comprises M first sub-resource(s), the first-type reference signal is transmitted by M first-type antenna port set(s) respectively in the M first sub-resource(s), the second radio resource comprises K second sub-resource(s), the second-type reference signal is transmitted by K second-type antenna port set(s) respectively in the K second sub-resource(s), any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively, the measurement on the first-type reference signal is used for determining the K second-type antenna port set(s).

10. The method according to claim 6, wherein the first-type reference signal is a Channel Status Information (CSI) reference signal, the second-type reference signal is a sounding reference signal;

or, the first downlink information comprises a fourth field, the fourth field of the first downlink information is used for identifying the information element corresponding to the first downlink information.

11. A device in a first node used for multi-antenna transmission, comprising:

a first processor, configured to receive Q1 pieces of second downlink information and Q2 pieces of third downlink information, wherein the Q1 pieces of second downlink information are respectively used for determining Q1 first-type radio resources and Q1 first-type identifiers, the Q1 first-type identifiers respectively correspond to the Q1 first-type radio resources, the Q2 pieces of third downlink information are respectively used for determining Q2 second-type radio resources and Q2 second-type identifiers, the Q2 second-type identifiers respectively correspond to the Q2 second-type radio resources, Q1 and Q2 are positive integers greater than 1, respectively; and receive first downlink information;

wherein the first downlink information is an information element, the first downlink information comprises a first field and a second field, the first field of the first downlink information indicates a first identifier of the Q1 first-type identifiers, the first identifier corresponds to a first radio resource in the Q1 first-type radio resources, the second field of the first downlink information indicates a second identifier of the Q2 second-type identifiers, the second identifier corresponds to a second radio resource in the Q2 second-type radio resources; the first radio resource is reserved for a first-type reference signal, the second radio resource is reserved for a second-type reference signal; a target receiver of the first-type reference signal comprises the first node, a transmitter of the second-type reference signal is the first node; a measurement on the first-type reference signal is used for generating the second-type reference signal; the first node is a User Equipment (UE).

12. The device in the first node according to claim 11, wherein the second downlink information is carried by a Radio Resource Control (RRC) signaling, and the third downlink information is carried by an RRC signaling.

13. The device in the first node according to claim 11, wherein the first processor receives a downlink signaling, wherein the downlink signaling is used for triggering a transmission of the second-type reference signal;

or, the first processor receives a downlink signaling, wherein the downlink signaling is used for triggering a transmission of the second-type reference signal, the downlink signaling is a physical layer signaling.

14. The device in the first node according to claim 11, comprising:

a second processor, receiving the first-type reference signal in the first radio resource, and a third processor, transmitting the second-type reference signal in the second radio resource, wherein the first radio resource comprises M first sub-resource(s), the first-type reference signal is transmitted by M first-type antenna port set(s) respectively in the M first sub-resource(s), the second radio resource comprises K second sub-resource(s), the second-type reference signal is transmitted by K second-type antenna port set(s) respectively in the K second sub-resource(s), any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively;

or, comprising:

a second processor, receiving the first-type reference signal in the first radio resource, and a third processor, transmitting the second-type reference signal in the second radio resource, wherein the first radio resource comprises M first sub-resource(s), the first-type reference signal is transmitted by M first-type antenna port set(s) respectively in the M first sub-resource(s), the second radio resource comprises K second sub-resource(s), the second-type reference signal is transmitted by K second-type antenna port set(s) respectively in the K second sub-resource(s), any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively, the measurement on the first-type reference signal is used for determining the K second-type antenna port set(s).

15. The device in the first node according to claim 11, wherein the first-type reference signal is a Channel Status Information (CSI) reference signal, the second-type reference signal is a sounding reference signal;

or, the first downlink information comprises a fourth field, the fourth field of the first downlink information is used for identifying the information element corresponding to the first downlink information.

16. A device in a second node used for multi-antenna transmission, comprising:

a fourth processor, configured to transmit Q1 pieces of second downlink information and Q2 pieces of third downlink information, wherein the Q1 pieces of second downlink information are respectively used for determining Q1 first-type radio resources and Q1 first-type identifiers, the Q1 first-type identifiers respectively correspond to the Q1 first-type radio resources, the Q2 pieces of third downlink information are respectively used for determining Q2 second-type radio resources and Q2 second-type identifiers, the Q2 second-type identifiers respectively correspond to the Q2 second-type radio resources, Q1 and Q2 are positive integers greater than 1, respectively; and transmit first downlink information;

wherein the first downlink information is an information element, the first downlink information comprises a first field and a second field, the first field of the first downlink information indicates a first identifier of the Q1 first-type identifiers, the first identifier corresponds to a first radio resource in the Q1 first-type radio resources, the second field of the first downlink information indicates a second identifier of the Q2 second-type identifiers, the second identifier corresponds to a second radio resource in the Q2 second-type radio resources; the first radio resource is reserved for a first-type reference signal, the second radio resource is reserved for a second-type reference signal; a transmitter of the first-type reference signal is the second node, a target receiver of the second-type reference signal comprises the second node; a measurement on the first-type reference signal is used for generating the second-type reference signal; the second node is a base station.

17. The device in the second node according to claim 16, wherein the second downlink information is carried by a Radio Resource Control (RRC) signaling and the third downlink information is carried by an RRC signaling.

18. The device in the second node according to claim 16, wherein the fourth processor transmits a downlink signaling, wherein the downlink signaling is used for triggering a transmission of the second-type reference signal;

or, the fourth processor transmits a downlink signaling, wherein the downlink signaling is used for triggering a transmission of the second-type reference signal, the downlink signaling is a physical layer signaling.

19. The device in the second node according to claim 16, comprising:

a fifth processor, transmitting the first-type reference signal in the first radio resource, and a sixth processor, receiving the second-type reference signal in the second radio resource, wherein the first radio resource comprises M first sub-resource(s), the first-type reference signal is transmitted by M first-type antenna port set(s) respectively in the M first sub-resource(s), the second radio resource comprises K second sub-resource(s), the second-type reference signal is transmitted by K second-type antenna port set(s) respectively in the K second sub-resource(s), any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively;

or, comprising:

a fifth processor, transmitting the first-type reference signal in the first radio resource, and a sixth processor, receiving the second-type reference signal in the second radio resource, wherein the first radio resource comprises M first sub-resource(s), the first-type reference signal is transmitted by M first-type antenna port set(s) respectively in the M first sub-resource(s), the second radio resource comprises K second sub-resource(s), the second-type reference signal is transmitted by K second-type antenna port set(s) respectively in the K second sub-resource(s), any first-type antenna port set of the M first-type antenna port set(s) comprises a positive integer number of first-type antenna port(s), any second-type antenna port set of the K second-type antenna port set(s) comprises a positive integer number of second-type antenna port(s), the M and the K are positive integers respectively, the measurement on the first-type reference signal is used for determining the K second-type antenna port set(s).

20. The device in the second node according to claim 16, wherein the first-type reference signal is a Channel Status Information (CSI) reference signal, the second-type reference signal is a sounding reference signal;
   or, the first downlink information comprises a fourth field, the fourth field of the first downlink information is used for identifying the information element corresponding to the first downlink information.

\* \* \* \* \*